US010778767B2

(12) United States Patent
Chernin et al.

(10) Patent No.: US 10,778,767 B2
(45) Date of Patent: Sep. 15, 2020

(54) PERSISTENT MEMORY REPLICATION IN RDMA-CAPABLE NETWORKS

(71) Applicant: International Business Machines Corporation, Armonk, NY (US)

(72) Inventors: Leonid Chernin, Tel Aviv (IL); Daniel Gan-Levi, Modiin (IL); Ehood Garmiza, Neve Ziv (IL); Constantine Gavrilov, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 15/582,027

(22) Filed: Apr. 28, 2017

(65) Prior Publication Data

US 2018/0316760 A1  Nov. 1, 2018

(51) Int. Cl.
*H04L 29/08* (2006.01)
*G06F 3/06* (2006.01)
*H04L 29/06* (2006.01)
*G06F 11/16* (2006.01)
*G06F 21/62* (2013.01)
*G06F 13/28* (2006.01)

(52) U.S. Cl.
CPC ......... *H04L 67/1097* (2013.01); *G06F 3/065* (2013.01); *G06F 3/067* (2013.01); *G06F 3/0611* (2013.01); *G06F 3/0613* (2013.01); *H04L 67/1095* (2013.01); *G06F 11/1641* (2013.01); *G06F 13/28* (2013.01); *G06F 21/6227* (2013.01); *H04L 69/22* (2013.01)

(58) Field of Classification Search
CPC .............. G06F 11/3037; G06F 11/184; G06F 15/17331; H04L 49/358; H04L 67/1097
See application file for complete search history.

(56) References Cited

U.S. PATENT DOCUMENTS

| 5,604,843 A | 2/1997 | Shaw et al. |
| 6,263,360 B1 | 7/2001 | Arnold et al. |
| 6,704,806 B1 | 3/2004 | Decker |

(Continued)

OTHER PUBLICATIONS

List of IBM Patents or Patent Applications Treated as Related, May 12, 2017, 2 pages.

(Continued)

*Primary Examiner* — Barbara B Anyan
(74) *Attorney, Agent, or Firm* — Stephen R. Tkacs; Stephen J. Walder, Jr.; Robert M. Sullivan

(57) ABSTRACT

A mechanism is provided in a data processing system comprising at least one processor and at least one memory, the at least one memory comprising instructions that are executed by the at least one processor and configure the at least one processor to implement a replication protocol for replicating memory from an initiator to a target. The initiator requests one or more pages of memory at the target. Responsive to the initiator receiving a page advertisement from the target, the initiator updates a list of pages at the initiator. The list of pages is replicated at the target. The initiator performs a remote direct memory access (RDMA) write to the one or more pages of memory at the target. Responsive to successful completion of the RDMA write, the initiator updates the list of pages at the initiator. Upon completion of the RDMA write the list of pages is updated at the target.

17 Claims, 16 Drawing Sheets

(56) References Cited

U.S. PATENT DOCUMENTS

| | | | |
|---|---|---|---|
| 7,103,626 B1 | 9/2006 | Recio et al. | |
| 7,103,888 B1 | 9/2006 | Cayton et al. | |
| 7,685,254 B2 | 3/2010 | Pandya | |
| 7,694,312 B2 | 4/2010 | Rivard et al. | |
| 7,953,854 B2* | 5/2011 | Elnozahy | H04L 49/351 |
| | | | 709/203 |
| 8,122,120 B1 | 2/2012 | Athreya et al. | |
| 8,271,669 B2 | 9/2012 | Bestler | |
| 8,601,250 B2 | 12/2013 | Kochar et al. | |
| 8,681,606 B2 | 3/2014 | Gavrilov et al. | |
| 8,780,913 B2 | 7/2014 | Gavrilov et al. | |
| 8,893,013 B1 | 11/2014 | Groves et al. | |
| 8,959,171 B2 | 2/2015 | Chadalapaka | |
| 9,047,178 B2 | 6/2015 | Talagala et al. | |
| 9,389,976 B2 | 7/2016 | Doshi et al. | |
| 2002/0087778 A1 | 7/2002 | Schoinas | |
| 2003/0043757 A1 | 3/2003 | White | |
| 2005/0132017 A1* | 6/2005 | Biran | G06F 13/28 |
| | | | 709/212 |
| 2005/0278724 A1 | 12/2005 | Buskens et al. | |
| 2007/0002838 A1 | 1/2007 | Komura | |
| 2007/0282967 A1* | 12/2007 | Fineberg | G06F 11/1641 |
| | | | 709/214 |
| 2008/0163176 A1 | 7/2008 | Krauss | |
| 2009/0307378 A1* | 12/2009 | Allen | H04L 47/10 |
| | | | 710/4 |
| 2012/0099585 A1 | 4/2012 | Yamamoto et al. | |
| 2012/0102504 A1 | 4/2012 | Iyer et al. | |
| 2012/0158794 A1 | 6/2012 | DeBacker et al. | |
| 2012/0221803 A1* | 8/2012 | Stabrawa | G06F 3/0611 |
| | | | 711/154 |
| 2013/0051394 A1 | 2/2013 | Gavriiov | |
| 2013/0185428 A1 | 7/2013 | Houghton et al. | |
| 2014/0177639 A1 | 6/2014 | Vershkov et al. | |
| 2014/0358972 A1* | 12/2014 | Guarrieri | G06F 21/6227 |
| | | | 707/781 |
| 2015/0089303 A1 | 3/2015 | Cardona et al. | |
| 2015/0264116 A1 | 9/2015 | Weiny et al. | |
| 2015/0281126 A1 | 10/2015 | Regula et al. | |
| 2016/0041906 A1 | 2/2016 | Mukherjee et al. | |
| 2016/0127495 A1 | 5/2016 | Tasoulas et al. | |
| 2016/0179640 A1 | 6/2016 | Murata | |
| 2017/0187846 A1* | 6/2017 | Shalev | H04L 69/22 |

OTHER PUBLICATIONS

Behrens, Jonathan et al., "Pushing Bytes: Cloud Scale Big-Data Replication with RDMC", Cornell University, Department of Computer Science, http://www.cs.cornell.edu/projects/quicksilver/public_pdfs/socc2016-paper17.pdf, (month unknown), 2016, 13 pages.

Merkin, C. M., "Method to Bound Peripheral Component Interconnect System Configurations", IBM Technical Disclosure Bulletin, vol. 37, No. 10, Abstract Only, Oct. 1, 1994, 2 pages.

Poke, Marius et al., "DARE: High-Performance State Machine Replication on RDMA Networks", ACM, Proceedings of the 24th International Symposium on High-Performance Parallel and Distributed Computing, HPDC'15, Portland, Oregon, Jun. 15-19, 2015, pp. 107-118.

Tasoulas, Evangelos et al., "A Novel Query Caching Scheme for Dynamic InfiniBand Subnets", IEEE, 2015 15th IEEE/ACM International Symposium on Cluster, Cloud and Grid Computing, May 4, 2015, pp. 199-210.

Wei, Xingda et al., "Fast In-memory Transaction Processing using RDMA and HTM", ACM, SOSP'15, Monterey, California, Oct. 4-7, 2015, pp. 87-104.

* cited by examiner

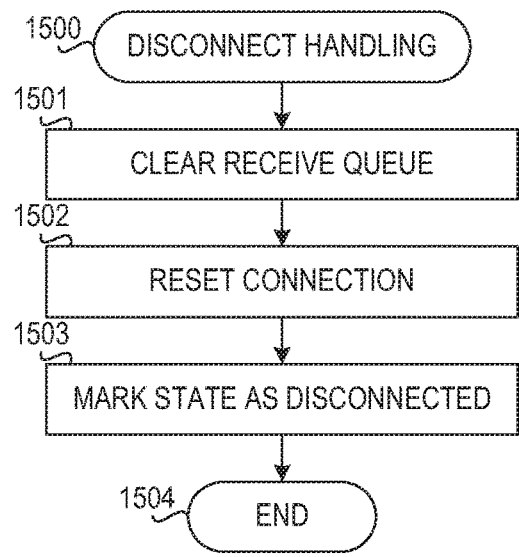
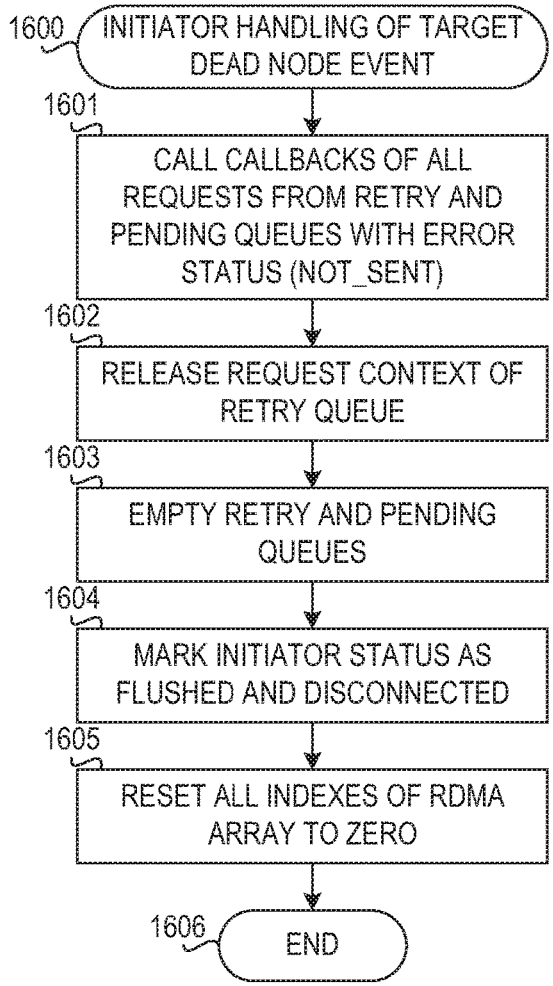
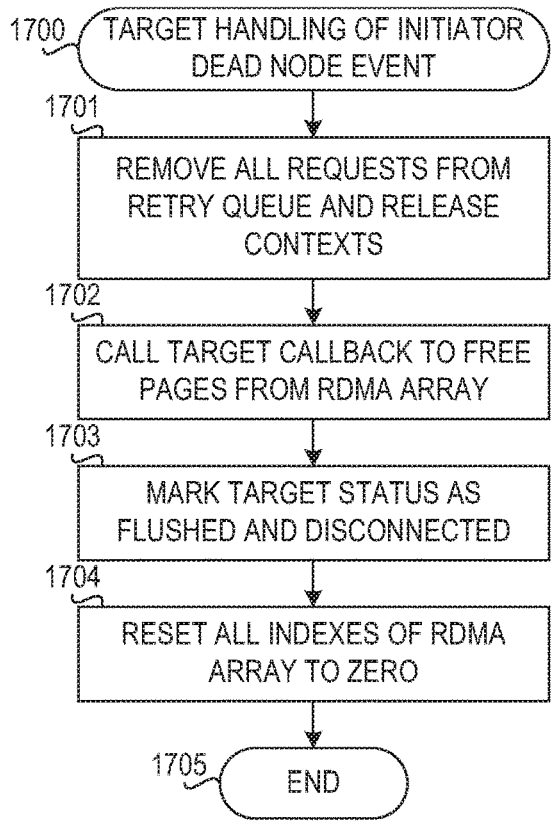

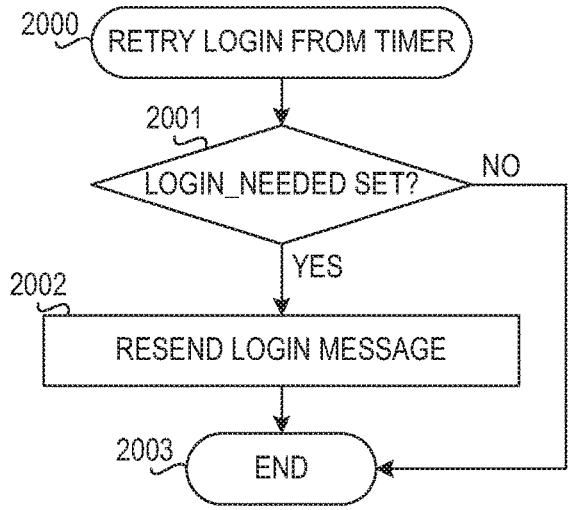
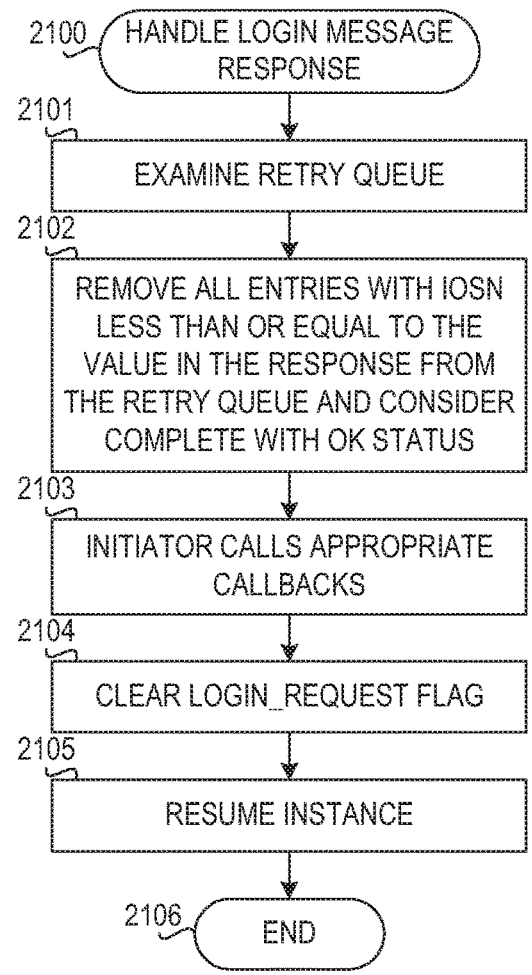
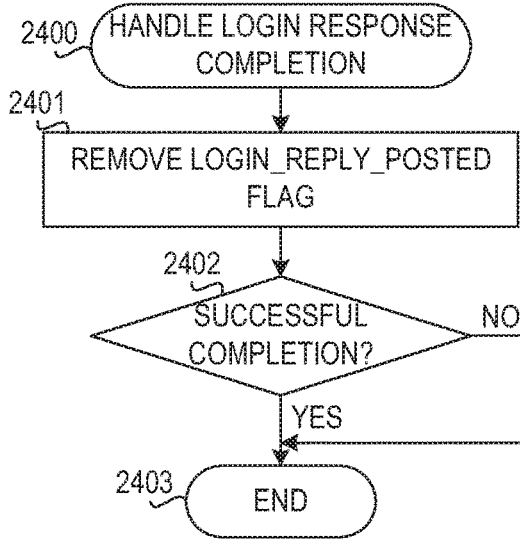

PERSISTENT MEMORY REPLICATION IN RDMA-CAPABLE NETWORKS

BACKGROUND

The present application relates generally to an improved data processing apparatus and method and more specifically to mechanisms for persistent memory replication in remote direct memory access (RDMA) capable networks.

InfiniBand™ is an industry-standard specification that defines an input/output architecture used to interconnect servers, communications infrastructure equipment, storage and embedded systems. A true fabric architecture, InfiniBand (IB) leverages switched, point-to-point channels with data transfers that generally lead the industry, both in chassis backplane applications as well as through external copper and optical fiber connections. Reliable messaging (send/receive) and memory manipulation semantics (remote direct memory access (RDMA)) without software intervention in the data movement path ensure the lowest latency and highest application performance. Infiniband APIs and protocols can be used on Ethernet Fabric, when ROCE transport (RDMA over Converged Ethernet) is deployed.

This low-latency, high-bandwidth interconnect requires only minimal processing overhead and is ideal to carry multiple traffic types (clustering, communications, storage, management) over a single connection. As a mature and field-proven technology, InfiniBand is used in thousands of data centers, high-performance compute clusters and embedded applications that scale from two nodes up to clusters utilizing thousands of nodes. Through the availability of long reach InfiniBand and Fast Ethernet over Metro and wide area network (WAN) technologies, InfiniBand and ROCE are able to efficiently move large data between data centers across the campus to around the globe.

DMA can also be used for "memory to memory" copying or moving of data within memory. Either source or destination memory can be IO memory that belongs to a hardware device (for example PCI IO memory). DMA can offload expensive memory operations, such as large copies or scatter-gather operations, from the CPU to a dedicated DMA engine. An implementation example is the I/O Acceleration Technology. Without DMA, when the CPU is using programmed input/output, it is typically fully occupied for the entire duration of the read or write operation, and is thus unavailable to perform other work. With DMA, the DMA master first initiates the transfer, and then it does other operations while the transfer is in progress, and it finally receives notification from the DMA slave when the operation is done. IO accelerators typically have dedicated DMA master engines, which allow the hardware to copy data without loading the CPU. This feature is useful at any time that the CPU cannot keep up with the rate of data transfer, or when the CPU needs to perform useful work while waiting for a relatively slow I/O data transfer. Many hardware systems use DMA, including disk drive controllers, graphics cards, network cards and sound cards. DMA is also used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel.

Remote direct memory access (RDMA) is a direct memory access from the memory of one computer into that of another without involving either one's operating system. This permits high-throughput, low-latency networking, which is especially useful in massively parallel computer clusters. RDMA supports zero-copy networking by enabling the network adapter to transfer data directly to or from application memory, eliminating the need to copy data between application memory and the data buffers in the operating system. Such transfers require little work to be done by CPUs, or context switches, and transfers continue in parallel with other system operations. When an application performs an RDMA Read or Write request, the application data is delivered directly to the network, reducing latency and enabling fast message transfer. However, this strategy presents several problems related to the fact that the target node is not notified of the completion of the request (single-sided communications).

RDMA capable applications exchange messages via objects called queue pairs (QPs). Each QP comprises of send and receive queue, and in order to exchange messages, the local and remote QPs need to connect to each other. The process of connection establishment involves sending and receiving connection management (CM) management datagrams (MADs) and is covered by Infiniband™ Specification.

Applications can use RDMA technology only after they have established reliable connections. Modern RDMA adapters are powerful, and it is not possible to utilize their power without use of multiple hardware event queues and multiple application threads. For example, a dual-port 100 Gbit adapter can process 6 million sends and 6 million receives per second (using message sizes of 4 KB). Such adapters have at least 100 events queues, and commodity servers with that many CPUs are widely available. One of the scalable approaches to utilize Interconnect and CPU performance is to use multi-domain approach, where each application thread opens its own device context and binds to its own device event queue. Each thread can pin to a given CPU and pin event queue to receive interrupts on the same CPU. This approach minimizes context switches, cross-CPU communication and cross-CPU locks, allowing maximization of system performance. At the same time, it requires each application thread to establish connections of its own.

To implement failover and data redundancy, modern data-center applications may replicate memory. For example, storage write transactions can be replicated to a number of backup nodes before acknowledgment of the write request is returned to the initiator. Trade transactions can be mirrored to backup trading servers before being acknowledged. Databases may replicate journal or other transactions before completing the store operations. All these applications strive to achieve minimal latency while consuming minimal CPU resources. The use of RDMA for these applications allows meeting these requirements.

Applications that use RDMA for memory replication typically deploy one of the two approaches:

1. Use of conventional storage protocols that supports RDMA. Examples of such protocols include SRP (SCSI RDMA protocol), ISER (ISCSI RDMA Extensions) or XBAND protocol deployed by XIV enterprise storage. In these protocols, initiator (a party that wants to replicate), sends a request to target. Request specifies the source addresses and their keys, and the information regarding what is being replicated. When using SRP or ISCSI—which are standard storage protocols—the destination may be a virtual storage volume in memory (the volume ID and offset within the volume), that correspond to the source memory that is replicated. When using XBAND, a more direct representation of what is the transaction that is being replicated is possible. The target then may allocate memory at destination and perform a set of RDMA read operations from initiator to target. When RDMA read application are complete, a reply message is sent to the initiator regarding the status of the transfer. This approach suffers from several performance limitations:

Multiple messages are done for one transfer that consume resources on both initiator and target: initiator send—target receive—target RDMA read—target send reply—initiator receive reply. This is opposed to the single RDMA transaction (if it can be done) to a pre-negotiated address from initiator to target.

RDMA reads are more expansive then RDMA writes. Implementation that can do RDMA write for memory replication would be more efficient.

Memory allocations per IO on target can be expansive.

2. Use of active-to-passive memory replication to a static memory log on passive remote is another approach. In this approach, a standby instance of the application runs on a remote node. When new passive instance is started, the active instance and remote instances connect. Remote instance allocates a static memory log and exchanges the size of log and its address with the active instance. More than one instance of memory window, as their dynamic addition or resizing is possible. The active instance of the application will replicate its transactions to one or more memory windows provided by the target. Shall active application fail, the standby application will assume active role and will restart transactions from the last known positions in the memory logs. This approach has advantage of good performance (no allocations per IO, RDMA writes as opposed to RDMA reads, and single initiator operation on initiator). The disadvantages of this approach are inability to deploy active-to-active implementations and poor error recovery. Upon a single replication error to a standby instance, it is assumed that a whole memory log is lost and it needs to be re-synchronized.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions that are executed by the at least one processor and configure the at least one processor to implement a replication protocol for replicating memory from an initiator to a target. The method comprises requesting, by the initiator, one or more pages of memory at the target. The method further comprises, responsive to the initiator receiving a page advertisement from the target, updating a list of pages at the initiator. The list of pages is replicated at the target. The method further comprises performing, by the initiator, a remote direct memory access (RDMA) write to the one or more pages of memory at the target. The method further comprises, responsive to successful completion of the RDMA write, updating the list of pages at the initiator. Upon completion of the RDMA write the list of pages is updated at the target.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 15 is a flowchart illustrating operation of a mechanism for disconnect handling in accordance with an illustrative embodiment;

FIG. 16 is a flowchart illustrating operation of a mechanism for handling target dead node event by the initiator in accordance with an illustrative embodiment;

FIG. 17 is a flowchart illustrating operation of a mechanism for handling initiator dead node event by target in accordance with an illustrative embodiment;

FIG. 20 is a flowchart illustrating operation of a mechanism for retrying login from the timer in accordance with an illustrative embodiment;

FIG. 21 is a flowchart illustrating operation of a mechanism for handling login message response in accordance with an illustrative embodiment;

FIG. 24 is a flowchart illustrating operation of a mechanism for handling a login response completion in accordance with an illustrative embodiment.

DETAILED DESCRIPTION

Figure 1:
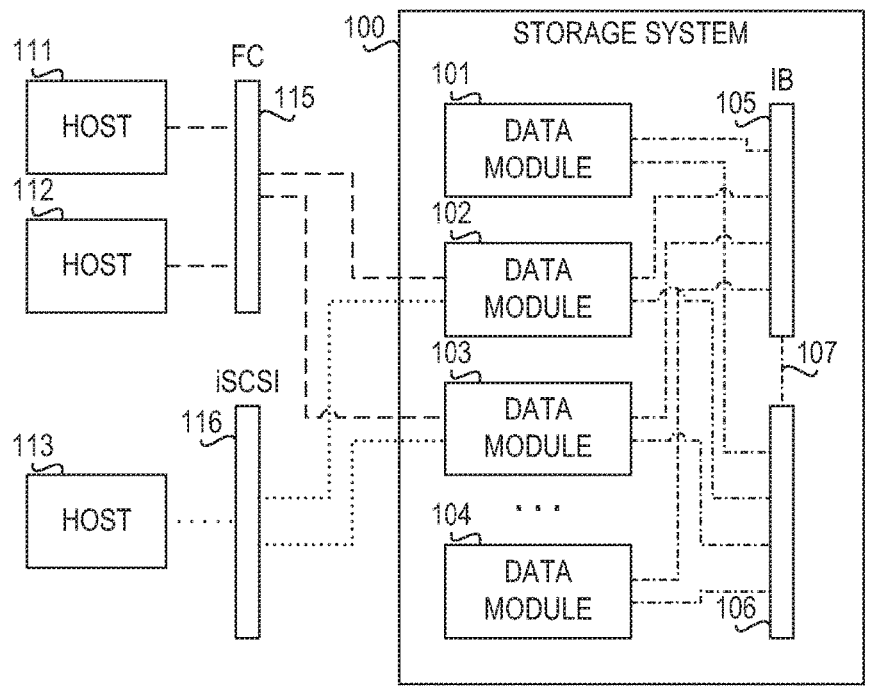
FIG. 1 depicts a pictorial representation of an example storage system in which aspects of the illustrative embodiments may be implemented.

The illustrative embodiments provide mechanisms for an efficient storage protocol for replicating memory. The protocol can use remote direct memory access (RDMA) and rely on local completion to signal message delivery. The protocol is persistent and will retry until the peer is reported inactive. The protocol supports an infinite number of messages and shared interconnect queues. Key features of the protocol include an RDMA page pool, reconnect synchronization, and posted, retry, and pending queues.

A standard storage protocol works through the following steps: 1) the initiator sends a replication request to the target describing the source memory addresses, 2) the target does an RDMA read from the initiator, and 3) the target sends an acknowledgement to the initiator. The illustrative embodiments use RDMA writes to pre-agreed-upon memory of the target and inform the target of performed transactions (informing can be aggregated). Completion of a transaction is judged by receiving hardware acknowledgements of completed RDMA write or completed send requests. The approach of the illustrative embodiments has lower latency and consumes less processor overhead on the initiator and the target.

To make the solution of the illustrative embodiments workable, a memory negotiation scheme is established. The initiator requests chunks of memory from the target based on replication requirements or memory window thresholds, while the target sends lists of pages to the initiator via advertising. The initiator and target share positions and sizes of the advertised pool. Persistency and error recovery are achieved via use of three queues (posted, retry, and pending). Error recovery steps ensure persistency and absence of data corruption or data loss.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one of" more or with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
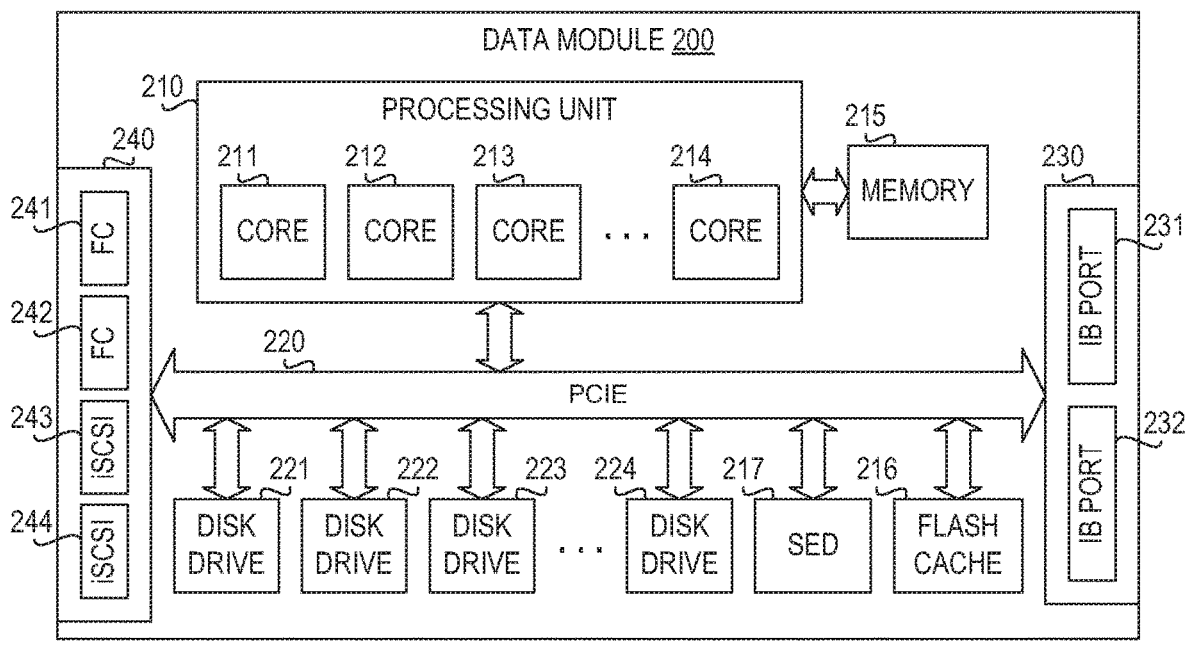
FIG. 2 is a block diagram of an example data module in which aspects of the illustrative embodiments may be implemented.
Figure 3:
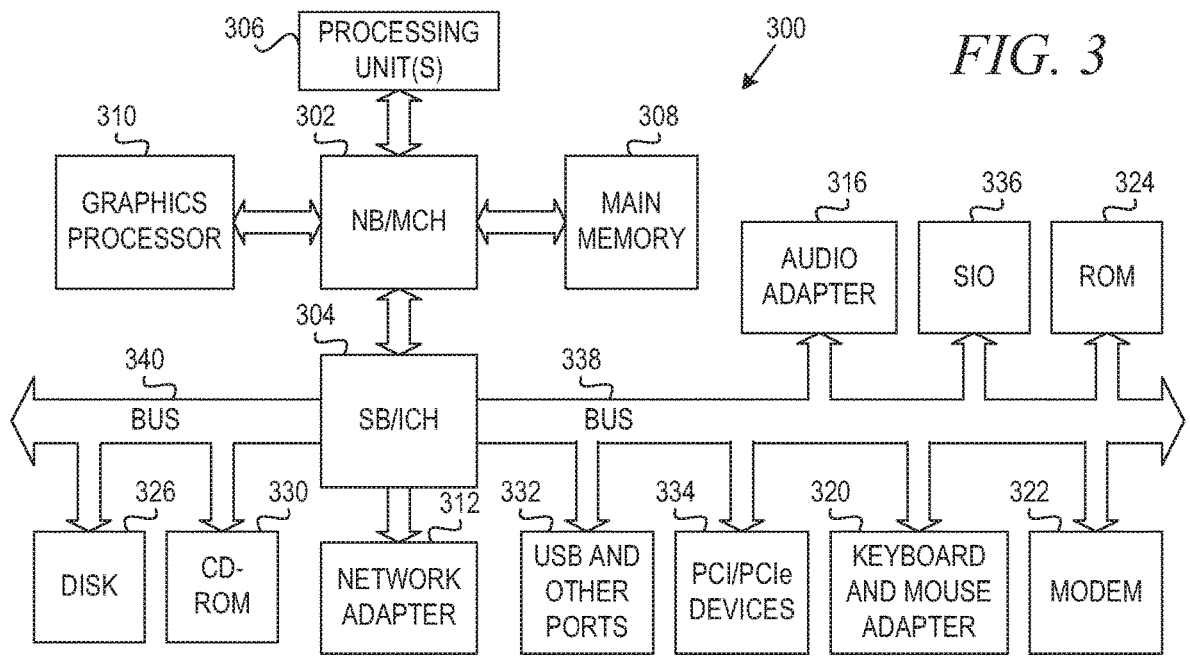
FIG. 3 is a block diagram of just one example data processing system in which aspects of the illustrative embodiments may be implemented.

The illustrative embodiments may be utilized in many different types of data processing environments. In order to provide a context for the description of the specific elements and functionality of the illustrative embodiments. FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example storage system in which aspects of the illustrative embodiments may be implemented. In the depicted example, hosts 111, 112 connect to storage system 100 via Fibre Channel (FC) switch 115, and host 113 connects to storage system 100 via Internet small computer systems interface (iSCSI) switch 116. Storage system 100 is a scalable enterprise storage system that is based on a grid array of hardware components. Storage system 100 can attach to both Fibre Channel Protocol (FCP) and Internet Protocol (IP) network iSCSI capable hosts 111-113. Storage system 100 supports a wide range of enterprise features, including hardware redundancy, synchronous and asynchronous mirroring, thin provisioning, data migration, quality of service controls, support for virtualization platforms, differential snapshots, compression, encryption, etc.

Storage system 100 has a variable number of data modules 101-104 (e.g., 6, 9, 12, or 15 modules). Data modules 101-104 communicate with each other via an InfiniBand (IB) network, facilitated by two IB switches 105, 106 connected via inter-module connectivity 107. Each data module 101-104 can serve as a cache driving backend IO and cache coherency. A limited number of data modules in the depicted example, data modules 102, 103—can serve as interfaces, providing FCP or iSCSI connectivity to hosts 111-113.

Storage system 100 may distribute data across all backend storage equally, so that each created volume is striped across all backend disks. In one example embodiment, two copies of each volume slice may be used, stored on different modules. Each volume slice has a designated primary and secondary cache. For reads, the data is fetched by an interface data module (e.g., data module 102) from the relevant primary cache module (e.g., data module 104). Reading a volume slice will cache it. For writes, an interface data module (e.g., data module 103) sends data to primary cache and the primary cache replicates data to the secondary cache (e.g., data module 101). The completion of the write is returned When two copies of data are stored in memory of two different modules (e.g., data modules 101, 103). Actual writing of data to backend storage or eviction to solid state drive (SSD) caches is done in the background according to cache management algorithms.

In an alternative embodiment, each volume uses three copies: one primary copy and two secondary copies. Read IOs fetch relevant data from the primary cache node and from the backend if not found in cache. The write IOs send data to primary cache, and the primary cache replicates the data to the secondary caches. The writes are completed after three copies of data are stored in memory of three different caches. This allows simultaneous loss of two data modules without data loss. At the same time, rebuilds are significantly faster and require only synchronizing caches or cache destages.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the data modules 101-104 and/or hosts 111-113 may be specifically configured to implement a mechanism for persistent memory replication in RDMA-capable networks. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as data module 101 or host 111, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates persistent memory replication.

FIG. 2 is a block diagram of an example data module in which aspects of the illustrative embodiments may be implemented. Data module 200 comprises processing unit 210, which has a plurality of processing cores 201-204, and memory 211. Processing unit 210 connects to peripheral component interconnect express (PCIe) bus 220, through which processing unit 210 communicates with flash cache 212, self-encrypting drive 213, disk drives 221-223, IfiniBand (IB) adapter 230, and IO adapter 240. In the depicted example, IB adapter 230 has two IB ports 231, 232, and 10 adapter 240 has two Fibre Channel (FC) ports 241, 242 and two Internet small computer systems internet (iSCSI) ports 243, 244.

Instructions for the operating system, the object-oriented programming system, and applications or programs are located on storage devices, such as disk drive 221, and may be loaded into memory 215 for execution by processing unit 210. The processes for illustrative embodiments of the present invention may be performed by processing unit 210 using computer usable program code, which may be located in a memory such as, for example, memory 215. As such, the data module shown in FIG. 2 becomes specifically configured to implement the mechanisms of the illustrative embodiments and specifically configured to perform the operations and generate the outputs described hereafter with regard to path resolution.

FIG. 3 is a block diagram of just one example data processing system in which aspects of the illustrative embodiments may be implemented. Data processing system 300 is an example of a computer, such as host 111 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller huh (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described hereafter with regard to persistent memory replication.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the symmetric multiprocessor system mentioned previously, without departing from the spirit and scope of the present invention.

In accordance with an illustrative embodiment, the storage system supports multi-domain interconnect. IO services (cache node, compression node, interface node, gateway node) work with multiple worker threads, called "domains." Each domain makes an effort of working with its own objects to minimize locking and inter-thread communication. In some implementations, single node-to-node connections are established per service level, and all domains share the same connections. In accordance with the illustrative embodiment, each domain has a private Interconnect context and private connections to other nodes. This has the following benefits:

No locking on interconnect objects that is very prohibitive for high IO on non-uniform memory access (NUMA) systems;

Private send and receive queues for each domain that allow resource optimization and easy IO processing (post and completions) from domain context;

All connectivity and IO events (errors and notifications) are easily processed in the domain context.

Enterprise applications that involve transactions often require transaction replication. Examples of such applications are, for example, trading transactions, storage replication (mirroring or storage migration), or replication of data due to internal storage data redundancy mechanisms, like implementation of RAID or proprietary redundancy. These enterprise applications often run on a grid architecture (multiple processing nodes) and a remote direct memory access (RDMA) capable interconnect that can perform remote memory writes without overhead of the central processing unit (CPU) on local and remote nodes.

While memory replication can be done efficiently using RDMA writes, the questions of how the remote side is notified about completions, how error recovery takes place, how remote memory is allocated challenge proprietary solutions.

Use of a standard (e.g., the iSCSI extends for RDMA (iSER) or SCSI RDMA protocol (SRP)) or proprietary RDMA-capable storage protocol is a common approach to this problem. The node that wishes to replicate acts as initiator, and the remote node acts as target. Transactions are done as follows:

initiator sends a small write request, providing source addresses request arrives to target target allocate memory for data transfer target does RDMA read to allocated memory target sends completion status initiator receives completion status This answers all questions on memory allocation and error recovery, since these questions are taken care of by the protocol itself, but it has prohibitive transaction latency. To complete such a transaction, one must send on initiator and receive on target, followed by RDMA read and send on target, followed by receive on the initiator. Also, RDMA reads have higher cost then RDMA writes.

Applications that replicate transaction logs often deploy active-passive architecture. One node acts as active, and other nodes (one or more) act as standby. When applications start, the memory regions are negotiated, and they are fixed (i.e., writes are done from top to bottom, and memory is not released to the pool). Transaction logs can be replicated from an active instance to passive instances using RDMA. If replication fails, the remote node can be considered as failed and can be restarted by the cluster solution, at which point background replication can be done. When an active application fails, some cluster solution selects one of the passive instances to assume the active role. The new active instance reads the transaction log and can resume transactions from the correct point.

This solution does have low transaction latency, since only RDMA writes are used, but is has limitations:

It has poor error recovery (one failure, and all replication needs to be redone);

It works well for active-passive setups, and does not support active-active applications; and, It works well for applications with journal log transactions. Storage applications that work with random cache memory that needs to be replicated and may be released later are not supported well by this solution.

Figure 4:
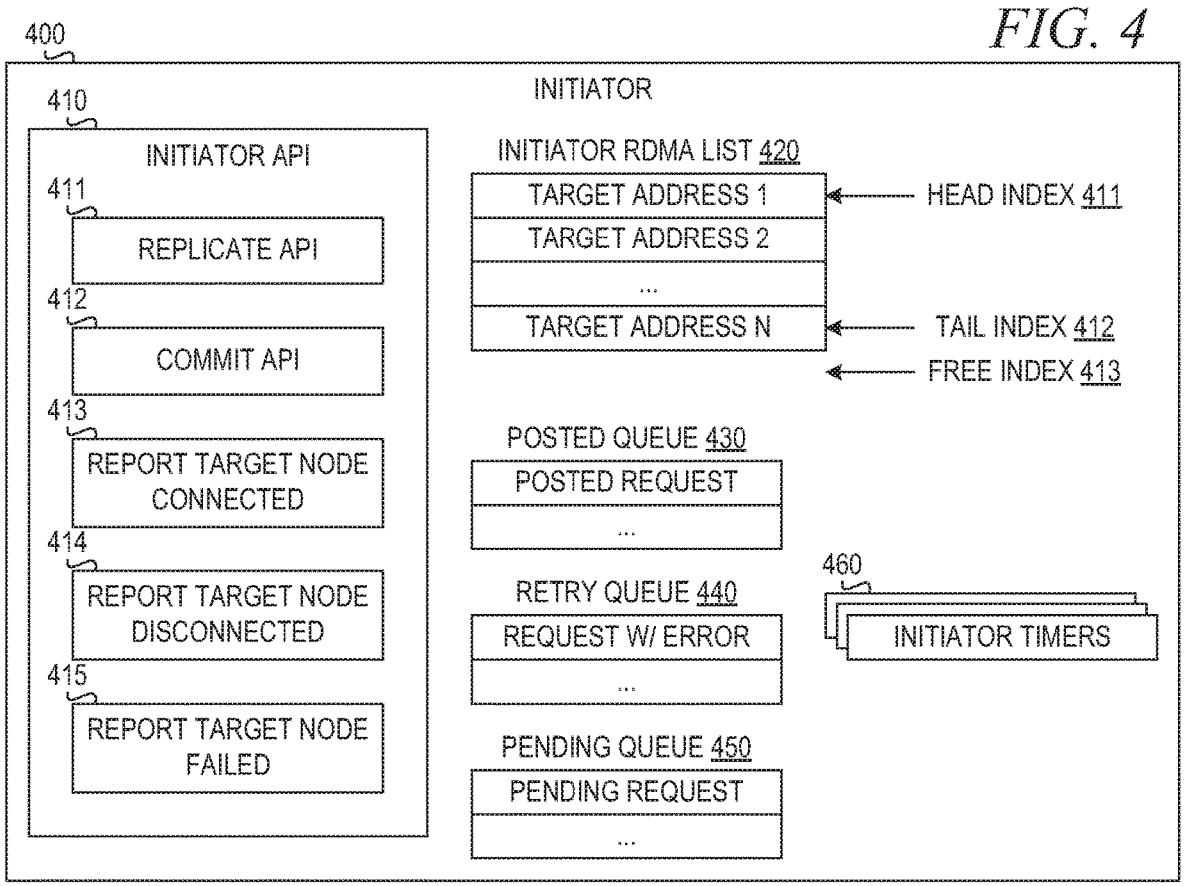
FIG. 4 is a block diagram illustrating the components of an initiator in a protocol for efficient memory replication using RDMA in accordance with an illustrative embodiment.

FIG. 4 is a block diagram illustrating the components of an initiator in a protocol for efficient memory replication using RDMA in accordance with an illustrative embodiment. Initiator 400 includes initiator application programming interface (API) 410. The initiator API 410 includes two main APIs to replicate memory: replicate API 411 and commit API 412. Replicate API 411 provides source memory, destination address, context, and notification callback. Commit API 412 provides data structure destination address, context, and notification callback. Initiator API 410 also provide the following functions: report target node connected 413, report target node disconnected 414, and report target node failed 415.

For each replication destination, initiator 400 also includes initiator RDMA list 420. In order to do RDMA, each initiator maintains a list 420 of pages (or agreed size, for example 4 KB), reserved by the target for this initiator. To request the pages, the initiator sends a page request message. The page request message has the following information: message code (page request), serial number of request, tail and free index positions in the page pool, minimal number of pages required, and suggested number of requested pages. This message is sent using the normal send function and will be received by the target.

The target responds with a page advertise message. The page advertise message has the following fields: message code (page advertise), serial number of the request, number of pages provided, and array of page addresses. This message is sent using the normal send function and will be received by the initiator. Once the page advertise is received by the initiator, the list of pages 420 is updated. Initiator RDMA list 420 is an array that contains target addresses. The array is treated as a circular array. Each initiator keeps track of the following index to that array: head index 411 (index to next free page), tail index 412 (index to last free page), and free index 413 (index to last index in the array that is not populated with any page). When the page advertise is received by the initiator, the initiator 400 moves the tail index 412 forward, which increases the number of available pages in initiator RDMA list 420. New pages can be added to slots between tail index and free index. When an RDMA is attempted, initiator 400 moves the head index 411 forward, which decreases the number of available pages in initiator RDMA list 420. The free index 413 trails the head index. When a commit completes, initiator 400 moves free index 413 forward, which increases the number of available page slots.

For each replication destination, initiator 400 implements a pool to track the state of its messages. There are three initiator queues: posted queue 430 contains posted requests, retry queue 440 contains requests that completed with error, and pending queue 450 contains requests for which there are no resources in the initiator pool or no RDMA resources in the initiator 400. In one embodiment, the initiator request context provides a node that allows adding to this queue without consuming additional resources.

Because shared domain pools are used for multiple connections and because the interconnect might return immediate errors if its queues (shared with other protocols) are full, initiator 400 uses initiator timers 460 to retry initiator requests. Whenever a timer is requested, initiator 400 does not set a timer if it is already set, if the initiator is disconnected, or if the posted queue 430 is not empty.

Figure 5:
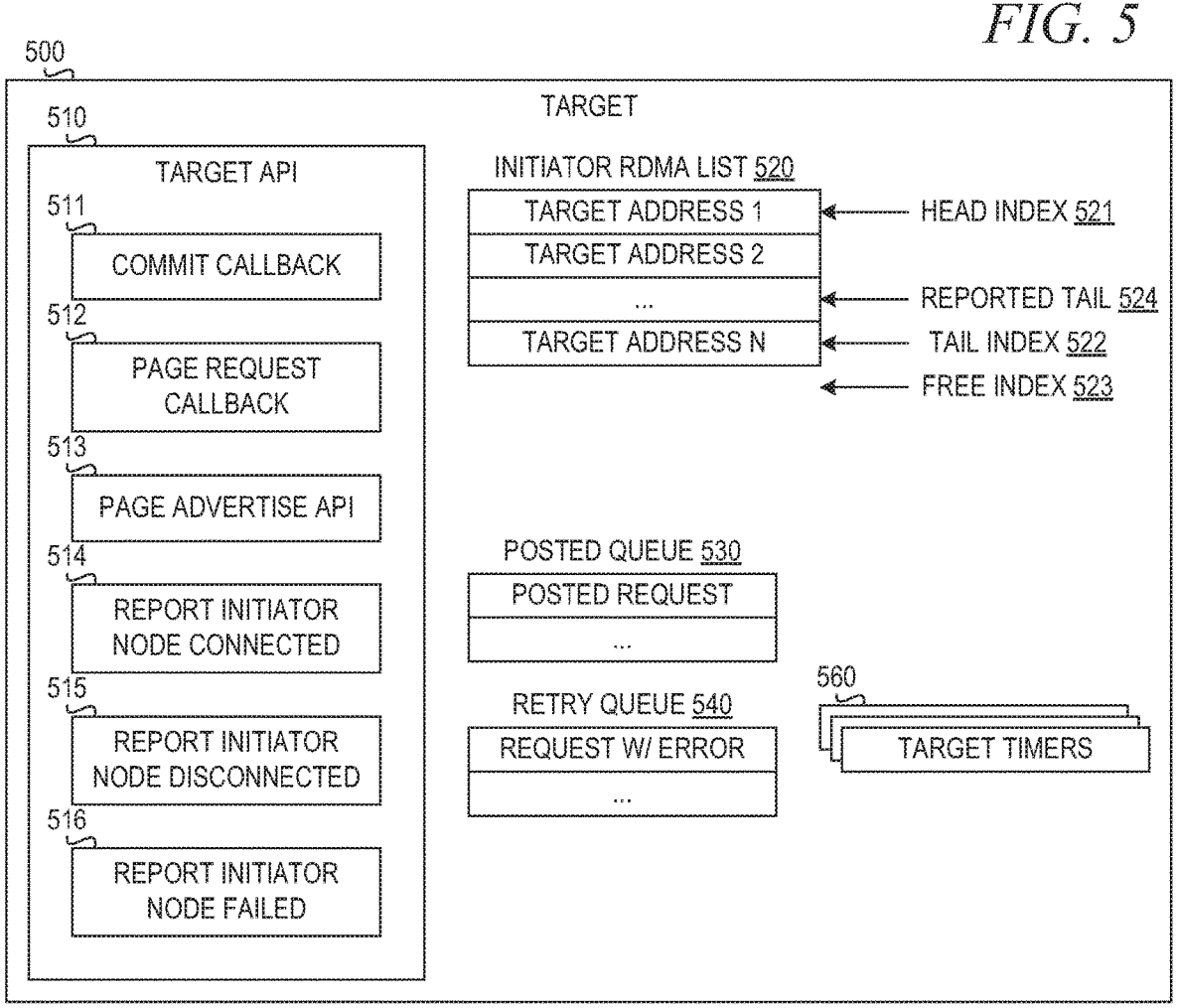
FIG. 5 is a block diagram illustrating the components for a target in a protocol for efficient memory replication using RDMA in accordance with an illustrative embodiment.

FIG. 5 is a block diagram illustrating the components for a target in a protocol for efficient memory replication using RDMA in accordance with an illustrative embodiment. Target 500 includes target API 510. The following functions are available in target API 510: commit callback 511 (provides data structure and source address), page request callback 512 (provides memory requirements and addresses to fill the results), page advertise API 513 (provides memory (list of pages) and number of provided pages), report initiator connected 514, report, initiator disconnected 515, and report initiator failed 516.

Target 500 has the same RDMA array 520 as the initiator to track the initiator RDMA array picture. The same indexes 521-523 are used and they are synchronized as messages are processed by the target. In addition to head index 521, tail index 522, and free index 523, target 500 also uses reported tail index 524. Because target 500 is allowed to advertise with larger chunks than can fit a single message and because an advertisement may happen at the target's discretion (without a request from the initiator), target 500 needs to know what pages have been sent to the initiator when handling a page request.

Target 500 uses posted queue 530 and retry queue 540, and these queues have the same functions as they do for the initiator. Because the number of target requests is small and each target is allowed to have a finite number of page advertisements, the size of the request pool is finite and cannot be exhausted.

Like the initiator, target 500 may use retry timers 560, because interconnect queues may share multiple protocols and become full.

Figure 6B:
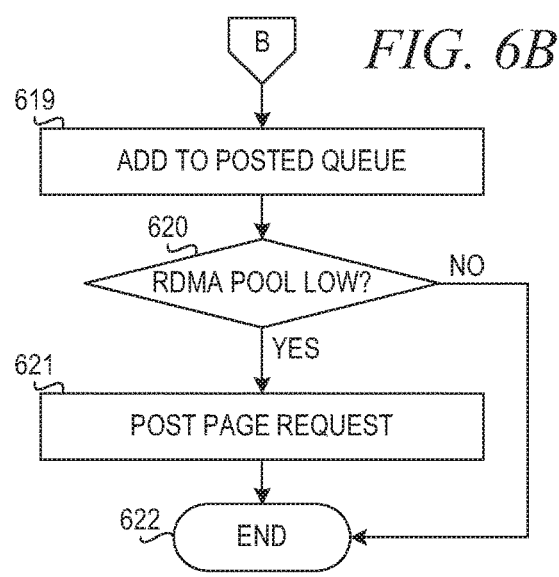
FIGS. 6A and 6B are flowcharts illustrating operation of an initiator performing an RDMA request in accordance with an illustrative embodiment.
Figure 6A:
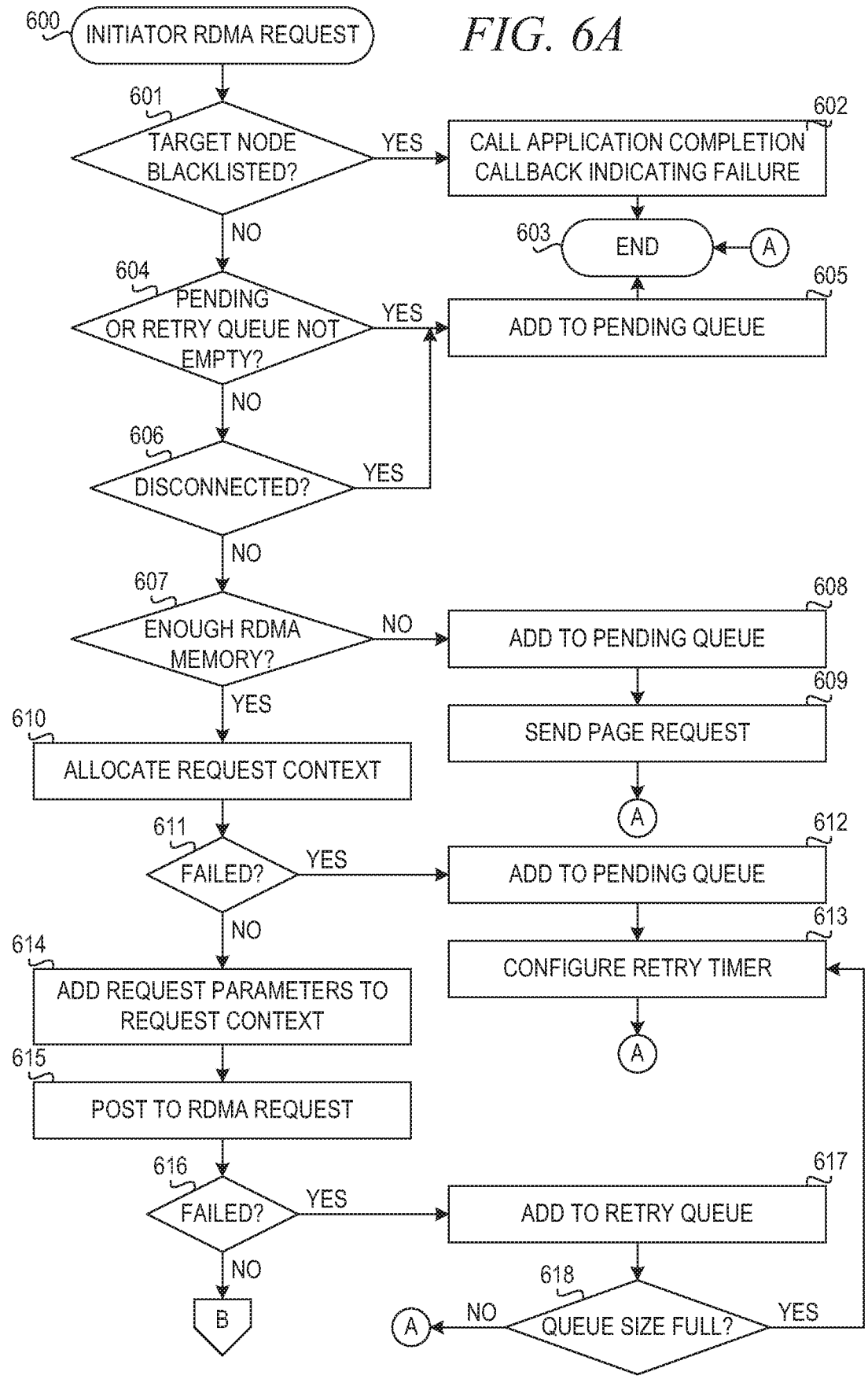

FIGS. 6A and 6B are flowcharts illustrating operation of an initiator performing an RDMA request in accordance with an illustrative embodiment. With reference to FIG. 6A, operation begins (block 600), and the initiator determines whether the target node is blacklisted (block 601). If the target node is blacklisted, then the initiator calls application completion callback that indicates immediate failure (block 602), and operation ends (block 603).

If the target is not blacklisted in block 601, then the initiator determines whether the pending queue or the retry queue are not empty (block 604). If the pending or retry queue are not empty, the initiator adds the RDMA request to the pending queue (block 605), and operation ends (block 603).

If both the pending queue and retry queue are empty in block 604, the initiator determines whether the target is disconnected (block 606). If the target is disconnected, the initiator adds the RDMA request to the pending queue (block 605), and operation ends (block 603).

If the target is not disconnected in block 606, then the initiator determines whether there is enough RDMA memory (bock 607). If there is not enough RDMA memory, the initiator adds the RDMA request to the pending queue (block 608) and sends the page request to the target (block 609). Thereafter, operation ends (block 603).

If there is enough RDMA memory in block 607, the initiator allocates a request context (block 610). Then, the initiator determines whether allocating the request context failed (block 611). If allocating the request context failed, the initiator adds the RDMA request to the pending queue (block 612) and configures a retry timer (block 613). Thereafter, operation ends (block 603).

If the initiator determines that allocating the request context succeeds in block 611, the initiator adds the request parameters to the request context (block 614), posts the RDMA context to the RDMA request (block 615), and determines whether the posting failed (block 616). If the posting failed, the initiator adds the RDMA request to the retry queue (block 617). Then, the initiator determines whether the posting failed with the queue size full code (block 618). If the posting failed with the queue size full code, then the initiator configures a retry timer (block 613), and operation ends (block 603). If the initiator determines the posting did not fail with the queue size full code in block 618, then operation ends (block 603).

If the initiator determines the posting succeed in block 616, then operation proceeds to block 619 in FIG. 6B, and the initiator adds the RDMA request to the posted list. Then, the initiator determines whether the RDMA pool is low (block 620). If the RDMA pool is low, then the initiator posts a page request (block 621), and operation ends (block 622). If the initiator determines the RDMA pool is not low in block 620, then operation ends (block 622). If the number of available page slots (not populated with any page) is low, the application may delay sending page request until more free slots become available (slots become available with the completion of initiator transfers). This allows to not send page requests too frequently, since small page requests are sufficient for small number of requests.

Figure 7:
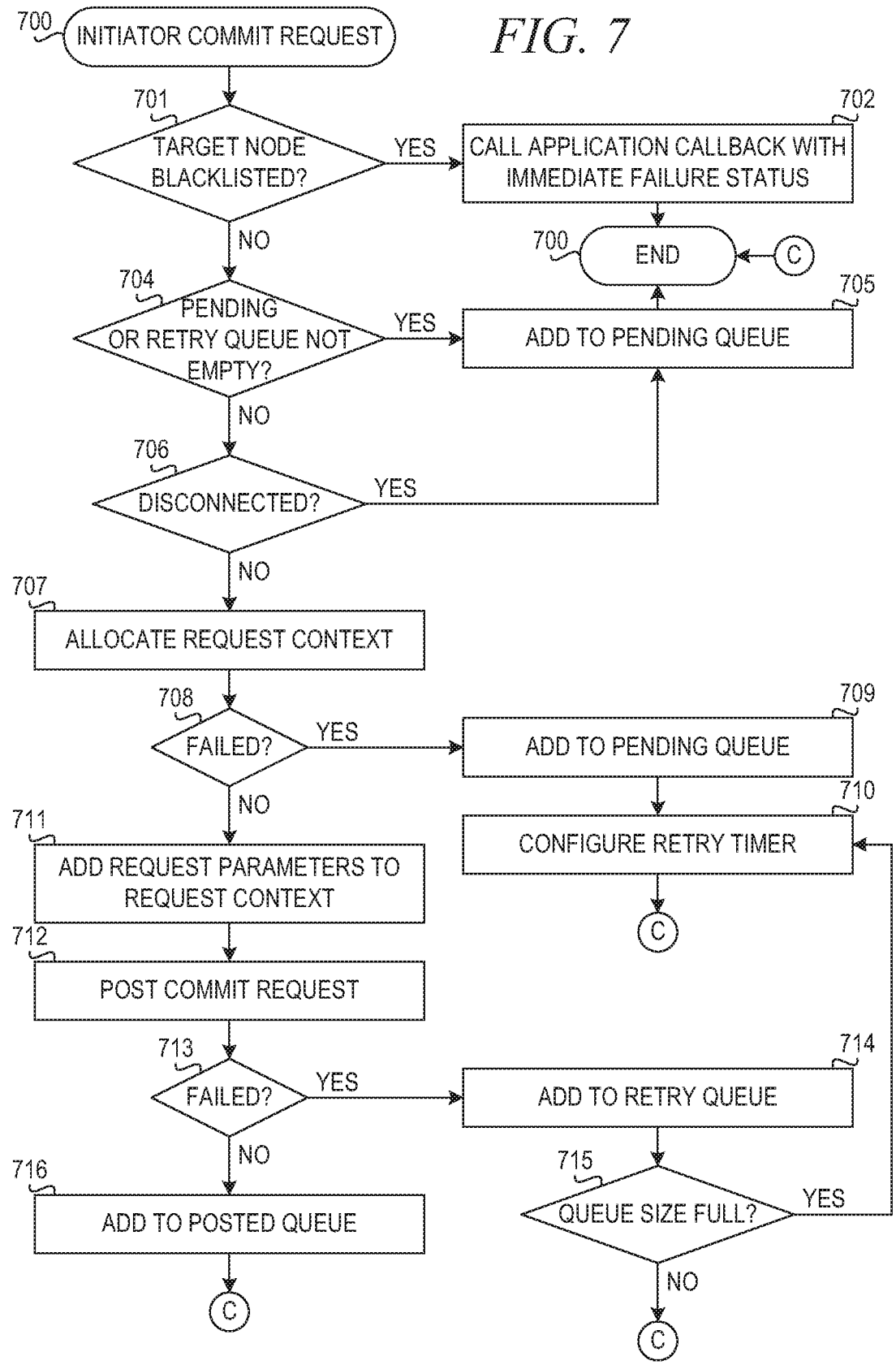
FIG. 7 is a flowchart illustrating operation of an initiator performing a commit request in accordance with an illustrative embodiment.

FIG. 7 is a flowchart illustrating operation of an initiator performing a commit request in accordance with an illustrative embodiment. It is expected that commit messages follow the RDMA message. They are expected to be sent with the same input/output sequence number (IOSN) as the tracked RDMA message to which they correspond. The reason this exists as an API is to allow the initiator to coalesce several commit messages into one message. If no coalescing is used, then each RDMA request is followed by a commit request.

The commit message has the following information: message code (commit request), start index position in initiator pool for this commit request, number of pages, free index position in the initiator pool, commit data structure, and serial number of request. This message is sent using the normal send function and will be received by the target.

Operation begins (block 700), and the initiator determines whether the target node is blacklisted (block 701). If the target node is blacklisted, then the initiator calls the application callback with immediate failure status (block 702) Then, operation ends (block 703).

If the target node is not blacklisted in block 701, then the initiator determines whether the pending queue or the retry queue are not empty (block 704). If the pending or retry queue are not empty, the initiator adds the commit request to the pending queue (block 705), and operation ends (block 703).

If both the pending queue and retry queue are empty in block 704, the initiator determines whether the target is disconnected (block 706). If the target is disconnected, the initiator adds the commit request to the pending queue (block 705), and operation ends (block 703).

If the target is not disconnected in block 706, then the initiator allocates a request context (block 707). Then, the initiator determines whether allocating the request context failed (block 708). If allocating the request context failed, the initiator adds the commit request to the pending queue (block 709) and configures a retry timer (block 710). Thereafter, operation ends (block 703).

If the initiator determines that allocating the request context succeeds in block 708, the initiator adds the request parameters to the request context (block 711), posts the commit request (block 712), and determines whether the posting failed (block 713). If the posting failed, the initiator adds the commit request to the retry queue (block 714). Then, the initiator determines whether the posting failed with the queue size full code (block 715). If the posting failed with the queue size full code, then the initiator configures a retry timer (block 710), and operation ends (block 703). If the initiator determines the posting did not fail with the queue size full code in block 713, then operation ends (block 703).

If the initiator determines the posting succeed in block 713, then the initiator adds the commit request to the posted list (block 716). Then, operation ends (block 703).

Figure 8:
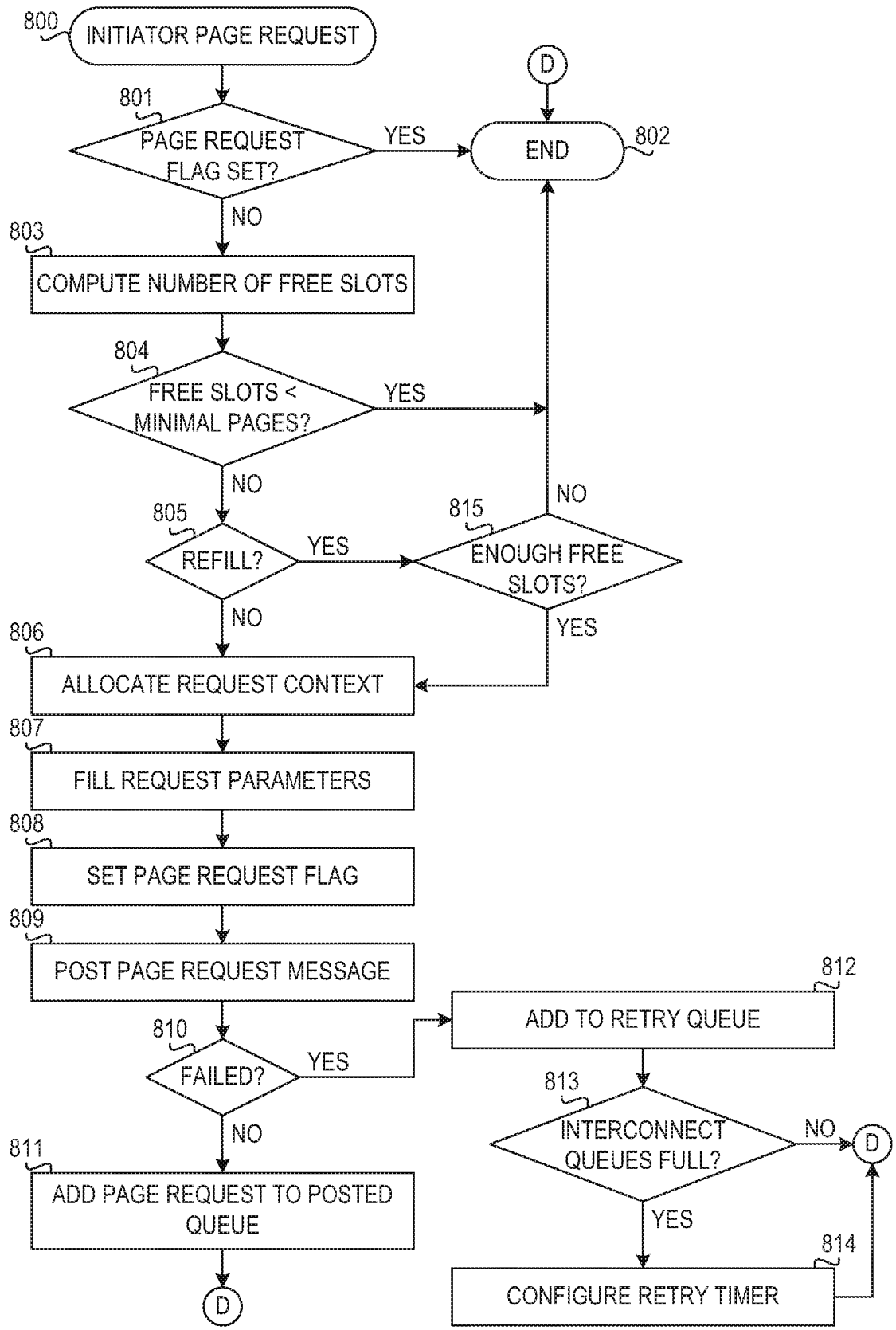
FIG. 8 is a flowchart illustrating operation of the initiator performing a page request in accordance with an illustrative embodiment.

FIG. 8 is a flowchart illustrating operation of the initiator performing a page request in accordance with an illustrative embodiment. Only one unanswered pending page request is allowed per target (replication destination).

Operation begins (block 800), when initiator requests a variable minimal number of pages. The minimal number of pages will be zero if page request is due to refill of the pool and non-zero is page request is due to replication request that cannot be satisfied because the lack of pages. At branch 801, the initiator determines whether the PAGE REQUEST flag is set (whether there is unanswered page request). If the flag is set (block 801: YES), the operation ends (block 802). If the PAGE REQUEST flag is not set (block 801: NO), operation continues at block 803, where the initiator computes the number of free slots.

The operation then proceeds to branch 804, where the amount of free slots is compared with the minimal number of requested pages. If the number of free slots is less than the minimal number of requested pages (block 803: YES), then operation ends (block 802). Otherwise, the operation proceeds to branch 805, where the initiator determines whether the request is due to refill (minimal number of required pages is zero). If the request is not due to refill (block 805: NO), the operation proceeds to block 806, where the initiator allocates a request context. Because no initiator is allowed to have more than one pending page request, page requests can use a private request pool of a finite size, the allocation from which cannot fail. The initiator then fills the request parameters (block 807), sets the page request flag (block 808), and posts the page request message (block 809).

A page request message has the following information: message code (page request), serial number of request, tail and free index positions in the page pool, minimal number of pages required, and suggested number of provided pages. The suggested number of provided pages is the minimum of free pages and MAX_PAGE_REQ_SIZE a protocol constant that defines the maximal number of pages that can be received due to a single page request. This message is sent using the normal send function and will be received by target. Then, the initiator determines whether the posting failed (block 810). If the initiator determines the posting succeeded, the initiator adds the page request to the posted queue (bock 811). Thereafter, operation ends (block 802).

If the initiator determines the posting failed in block 810, the initiator adds the page request to the retry queue (block 812). Then, the initiator determines whether the posting failed with the interconnect queues full code (block 813). If the posting failed with the interconnect queues full code, then the initiator configures a retry timer (block 814), and operation ends (block 802). If the initiator determines the posting did not fail with the interconnect queues fall code in block 813, then operation ends (block 802).

Returning to block 805, if the request is due to refill, then the initiator determines whether enough free slots are available to justify immediate send of the page request (block 815). To minimize the amount of page requests, it may be desirable to send refill requests when commit completions arrive and more free slots become available. To achieve this, refill page requests are not sent if the amount of free slots is less than MIN_PAGE_REQ_SIZE . . . a predefined protocol constant. If the amount of free slots is less than the defined threshold, meaning there are not enough free slots available to justify sending a page request (block 805: NO), then operation ends (block 802). Otherwise, operation proceeds to blocks 806-814, where the initiator immediately posts a page request.

Figure 9A:
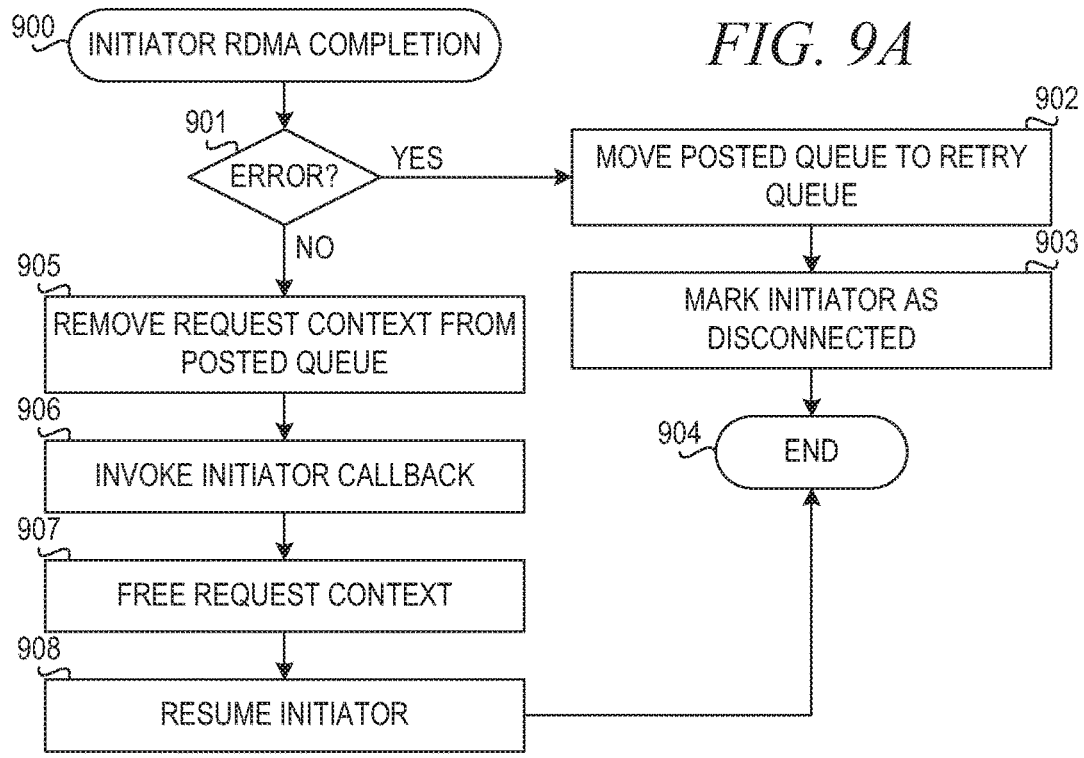
FIGS. 9A-9C are flowcharts illustrating the operations of mechanisms for handling completions in accordance with an illustrative embodiment.
Figure 9B:
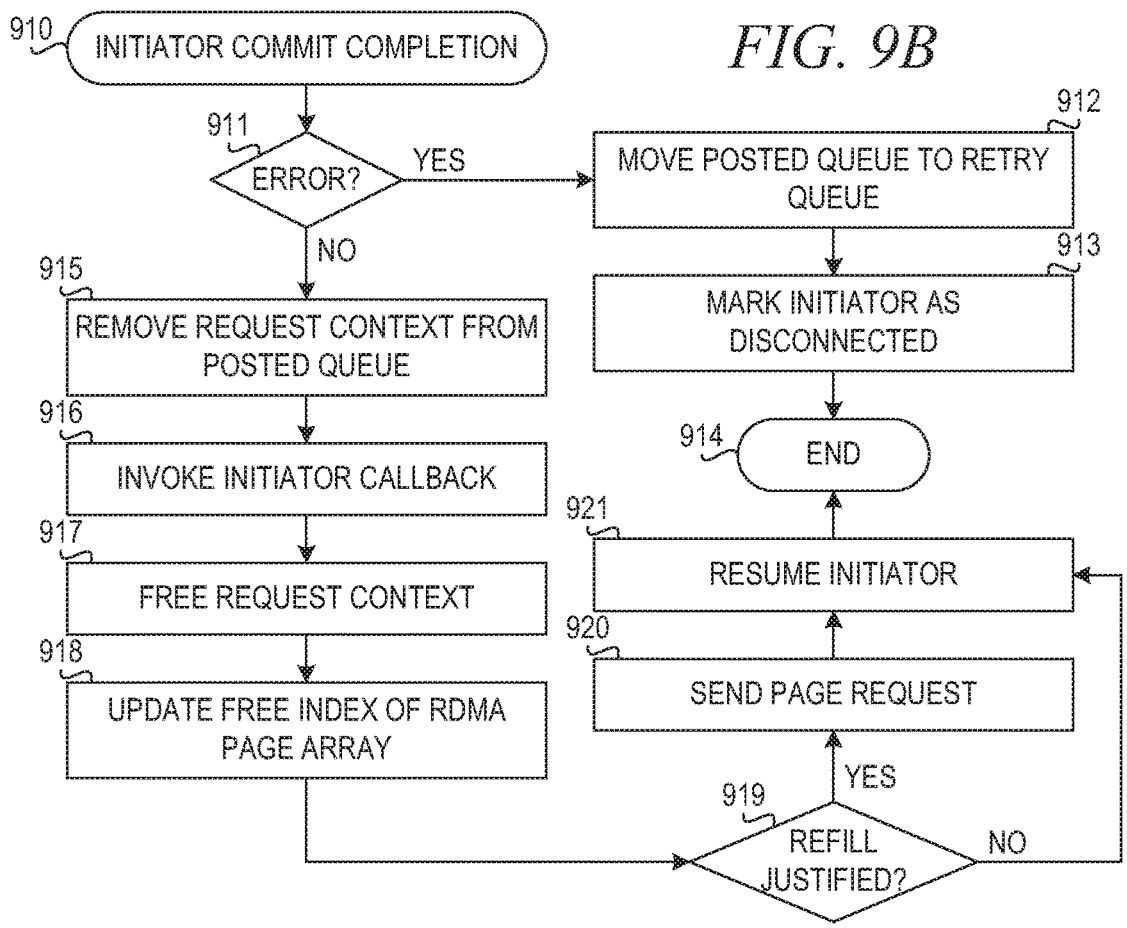
Figure 9C:
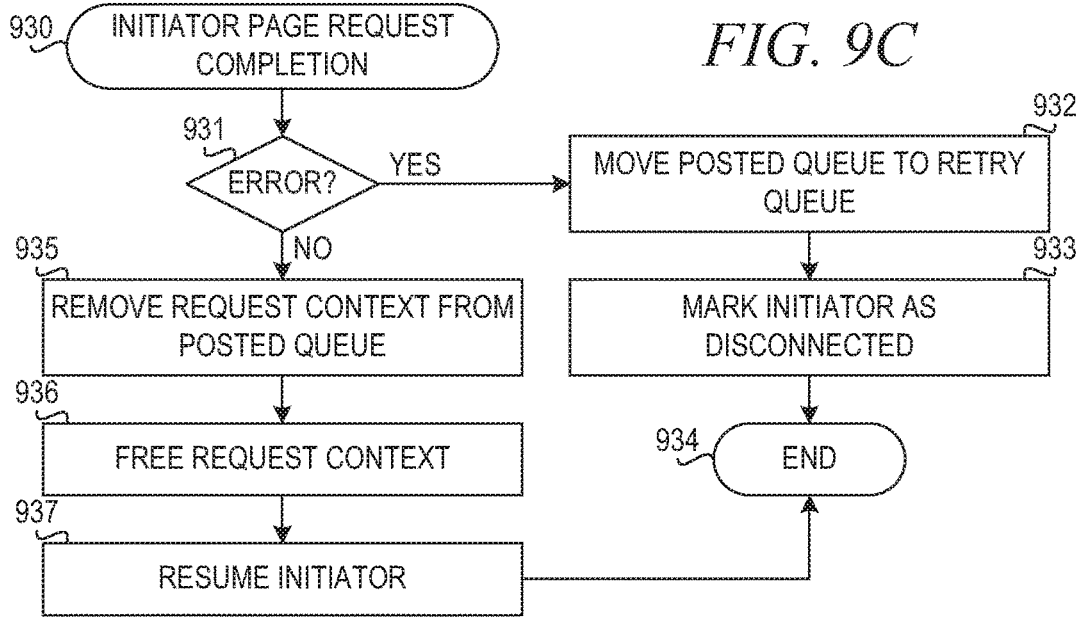

FIGS. 9A-9C are flowcharts illustrating the operations of mechanisms for handling completions in accordance with an illustrative embodiment. More specifically, FIG. 9A is a flowchart illustrating operation of a mechanism for handling RDMA completion in accordance with an illustrative embodiment. Operation begins (block 900), and the mechanism determines whether the completion indicates an error (block 901). If the completion indicates an error, then the mechanism moves all requests from the posted queue to the retry queue (block 902) and marks the initiator as disconnected (block 903). (Requests on RDMA capable devices complete in the same order as they were posted, and a first completion error means the target is disconnected and also that the rest of the completions will return error.) Thereafter, operation ends (block 904).

If the mechanism determines the completion does not indicate an error in block 901, then the mechanism removes the RDMA request context from the posted queue (block 905), invokes the initiator callback (block 906), frees the request context (block 907), and resumes the initiator (block 908). Resume takes place if either retry or pending lists were not empty due to shortage of resources in protocol pools or interconnect queues that have just become available. Thereafter, operation ends (block 904).

FIG. 9B is a flowchart illustrating operation of a mechanism for handling commit completion in accordance with an illustrative embodiment. Operation begins (block 910), and the mechanism determines whether the completion indicates an error (block 911). If the completion indicates an error, then the mechanism moves the requests from the posted queue to the retry queue (block 912) and marks the initiator as disconnected (block 913). (Post requests on RDMA capable devices complete in the same order as they were posted, and a first completion error means target is disconnected and it also means the rest of the completions will return error.) Thereafter, operation ends (block 914).

If the mechanism determines the completion does not indicate an error in block 911, then the mechanism removes the request context from the posted queue (block 915), invokes the initiator callback (block 916), and frees the request context (block 917). The mechanism also updates the free index of the RDMA page array to reflect the commit message parameters (block 918). At branch 919, the initiator checks whether refill of the page pool is justified. Refill of the page pool is justified if the free pages is below threshold and the amount of free pages is no less than MIN_PAGE_REQ_SIZE value described above. If page refill is justified (block 919: YES), the page request is sent (block 920) and operation proceeds to block 921. If page request is not justified (block 919: NO), then operation proceeds to block 921.

At block 921, the initiator is resumed. Resume takes place if either retry or pending lists were not empty due to shortage of resources in protocol pools or interconnect queues that have just become available. Thereafter, operation ends (block 914).

FIG. 9C is a flowchart illustrating operation of a mechanism for handling page request completion in accordance with an illustrative embodiment. Operation begins (block 930), and the mechanism determines whether the completion indicates an error (block 931). If the completion indicates an error, then the mechanism moves requests from the posted queue to the retry queue (block 932) and marks the initiator as disconnected (block 933). (Post requests on RDMA capable devices complete in the same order as they were posted, and a first completion error means target is disconnected and it also means the rest of the completions will return error.) Thereafter, operation ends (block 934).

If the mechanism determines the completion does not indicate an error in block 931, then the mechanism removes the request context from the posted queue (block 935), frees the request context (block 936), and resumes the initiator (block 937). Resume takes place if either retry or pending lists were not empty due to shortage of resources in protocol pools or interconnect queues that have just become available. Thereafter, operation ends (block 934).

Figure 10:
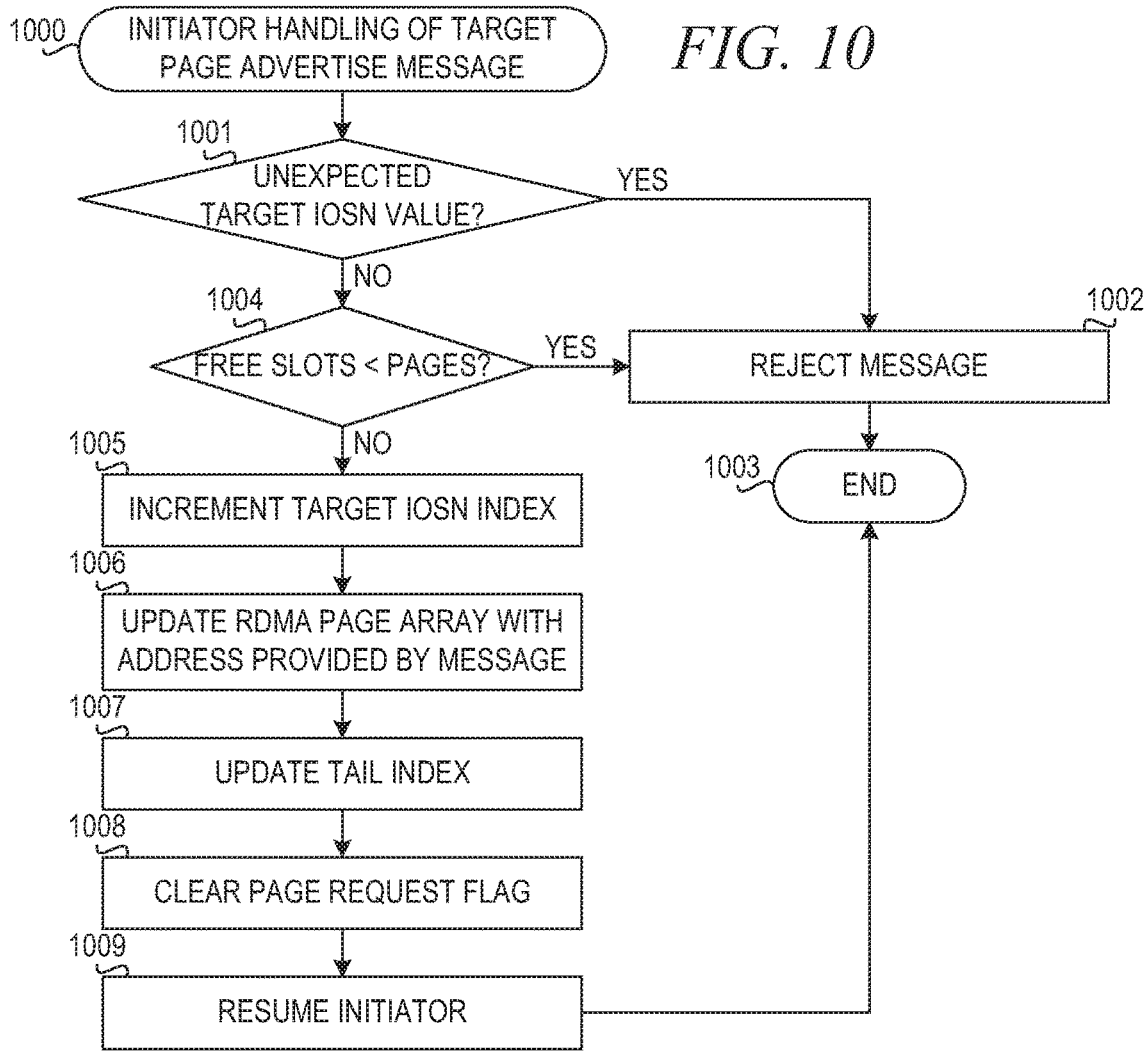
FIG. 10 is a flowchart illustrating operation of a mechanism for handling target page advertise messages in accordance with an illustrative embodiment.

FIG. 10 is a flowchart illustrating operation of a mechanism for handling target page advertise messages in accordance with an illustrative embodiment. Operation begins (block 1000), and the mechanism determines whether the peer (target) IOSN (IO serial number) value of the request is an unexpected value (block 1001). The initiator may track target IOSN numbers to detect protocol errors. If the mechanism determines the target IOSN value is unexpected, then the mechanism determines this is a fatal application error and rejects the message (block 1002). Thereafter, operation ends (block 1003).

If the target IOSN value is not an unexpected value in block 1001, then the mechanism determines whether the number of free slots in the RDMA array is less than the number of provided pages (block 1004). If the number of free slots in the RDMA array is less than the number of provided pages, then the mechanism determines this is a final application error and rejects the message (block 1002). Thereafter, operation ends (block 1003).

If the number of free slots in the RDMA array is not less than the number of provided pages in block 1004, then the mechanism increments the target IOSN index (block 1005), updates the RDMA page array with the addresses provided in the message (block 1006), updates the tail index (block 1007), and clears the page request flag (block 1008). Then, the mechanism calls resume of the initiator (block 1009), and operation ends (block 1003). Resume will take place if retry or pending lists are not empty due to shortage of resources that have just become available. Specifically, in the case of advertised pages there may be pending requests that could not be satisfied because pages were not available.

Figure 11:
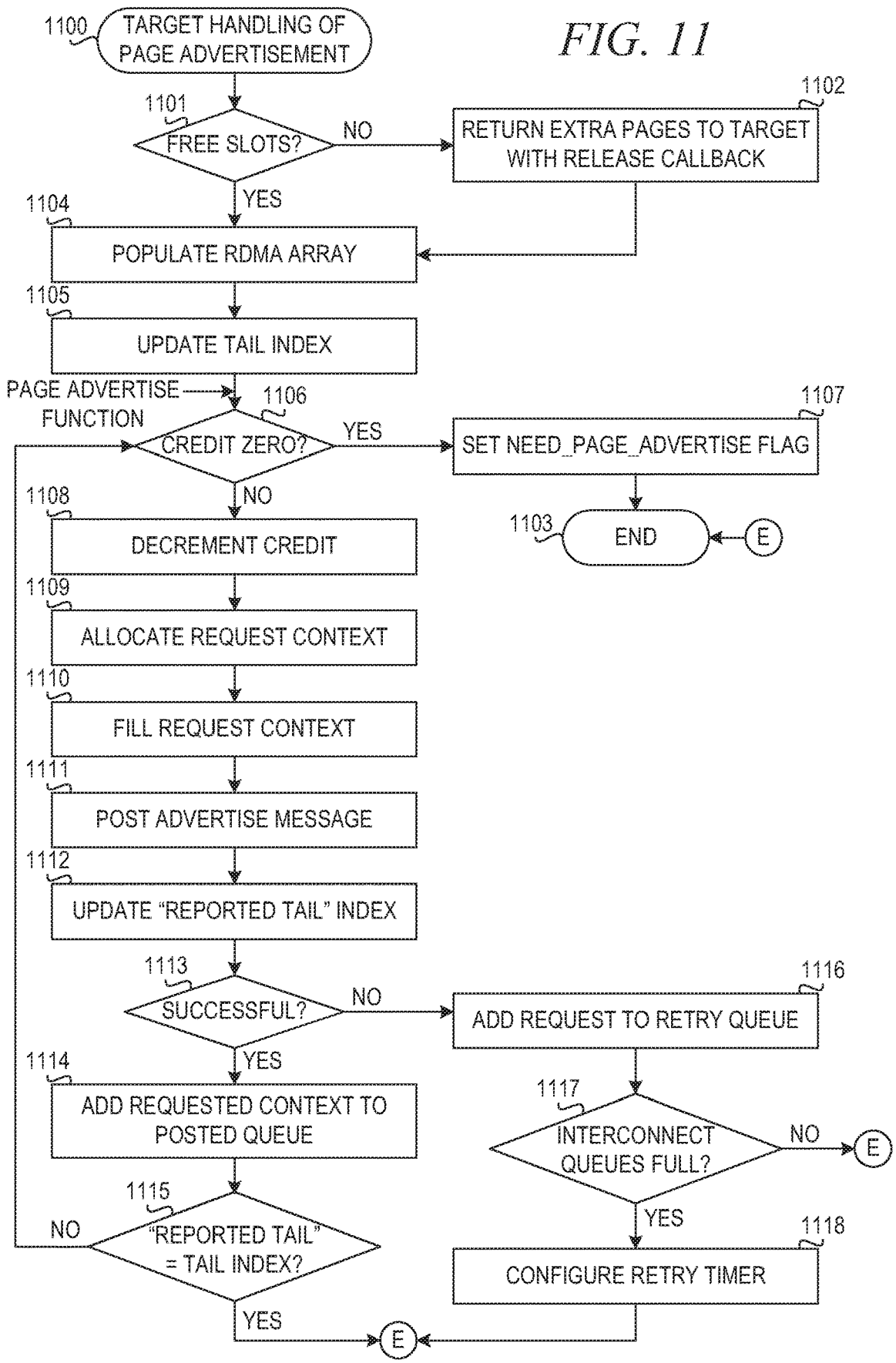
FIG. 11 is a flowchart illustrating operation of a mechanism for target handling of a page advertisement in accordance with an illustrative embodiment.

FIG. 11 is a flowchart illustrating operation of a mechanism for target handling of a page advertisement application request in accordance with an illustrative embodiment. Each target is allowed a finite number of page advertisements pending for a specific initiator (called page advertised credits). This is due to the fact that the target may need several messages to populate the entire RDMA array. The size of a single advertise message may be limited and not sufficient to populate the entire array. At the same time, the size of a pool for page advertise context is finite, and we want to insure that request context allocations do not fail. The credits allocated for each initiator take these constraints into account.

Operation begins when a page advertisement API is invoked (block 1100), and the mechanism determines whether there are enough free slots to store the provided pages (block 1101). If there are not enough tree slots, the mechanism returns extra pages to the target with a release callback (block 1102). Thereafter, operation continues at block 1104.

If there are enough free slots in block 1101, then the mechanism populates the RDMA array (block 1104) and updates the tail index (bock 1105). Then, the mechanism determines whether the page advertise credit is zero (block 1106). At the start of the application, the credit is defined to a predefined number, and each queued page advertise decrements the credit value while each completion of a page advertise increments the credit value. If the page advertise credit is zero, then the mechanism sets the NEED_PAGE_ADVERTISE flag (block 1107). Thereafter, operation ends (block 1103).

If the page advertise credit is not zero in block 1106, then the mechanism decrements the credit (block 1108), allocates a request context (block 1109), fills the request context (block 1110), and posts the advertise message (block 1111). Because the interconnect works with finite size buffers on the receiver side of the initiator, the mechanism cannot advertise more addresses than fit into that buffer. The mechanism updates the "reported tail" index of the RDMA array to reflect the pending page advertisement (block 1112).

Then, the mechanism determines whether the posting message is successful (block 1113). If the posting is successful, the mechanism adds the request context to the posted queue (block 1114), and then the mechanism determines whether the reported tail index equals the tail index (block 1115). If the reported tail index is not equal to the tail index, then operation returns to block 1106, and blocks 1106-1115 repeat until the reported tail index equals the tail index. If the reported tail index does equal the tail index in block 1115, then operation ends (block 1103).

If the posting is not successful in block 1113, then the mechanism adds the request to the retry queue (block 1116). The mechanism determines whether the posting failed with the interconnect queues full code (block 1117). If the posting failed with the interconnect queues full code, then the mechanism configures a retry timer (block 1118), and operation ends (block 1103), if the mechanism determines that the posting did not fail with the interconnect queues full code in block 1117, then operation ends (block 1103).

Figure 12:
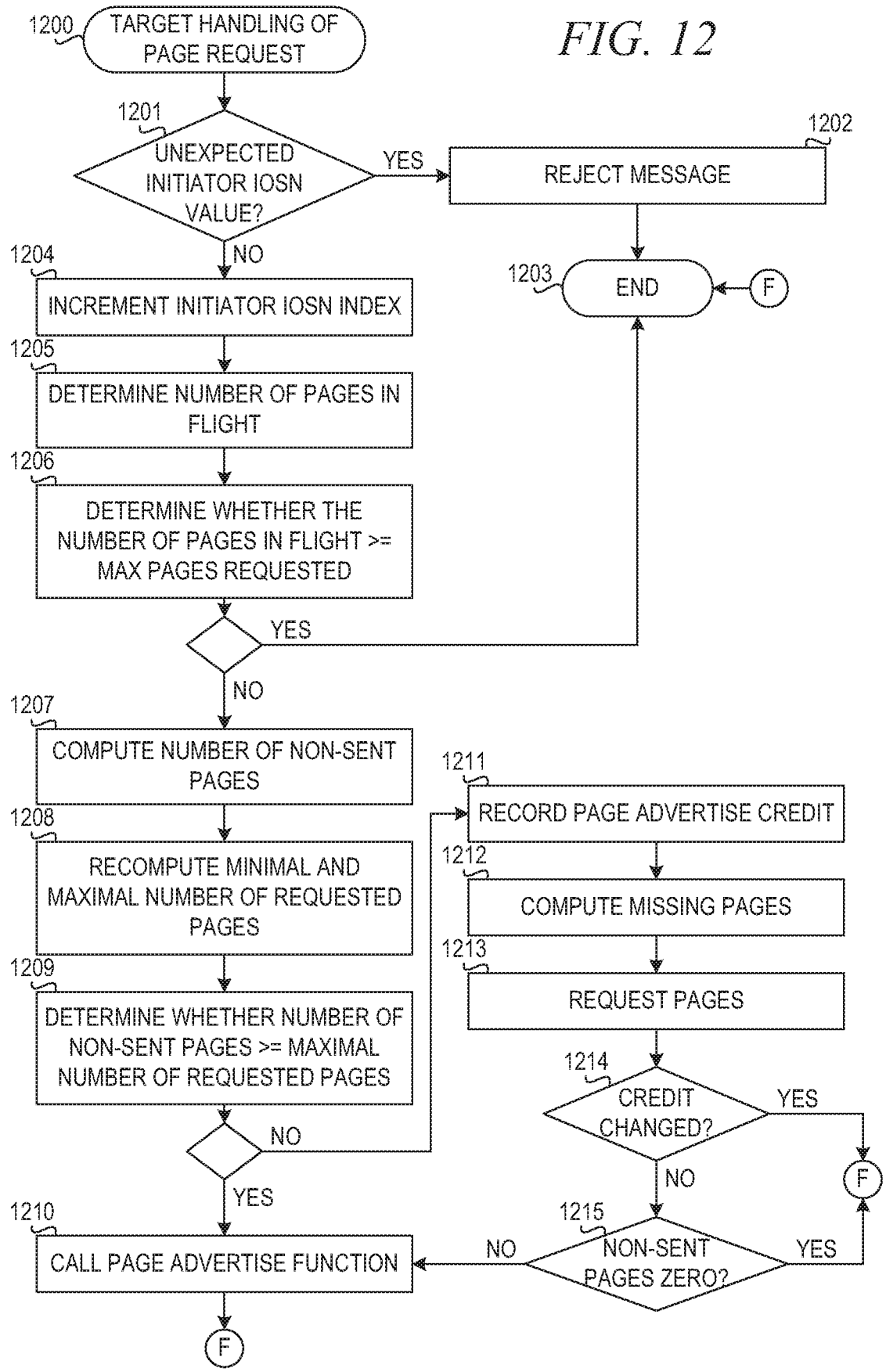
FIG. 12 is a flowchart illustrating operation of a mechanism for target handling of a page request in accordance with an illustrative embodiment.

FIG. 12 is a flowchart illustrating operation of a mechanism for target handling of a page request in accordance with an illustrative embodiment. Operation begins with the receipt of a page request (block 1200), and the mechanism determines whether the peer (initiator) ISON value of the request is an unexpected value (block 1201). The target may track the initiator IOSN values to detect protocol violations. If the mechanism determines the initiator IOSN value is unexpected, then the mechanism rejects the message (block 1202). Thereafter, operation ends (block 1203).

If the initiator IOSN value is not an unexpected value in block 1201, then the mechanism increments the initiator IOSN index on the target (block 1204). At step 1205, the mechanism determines the number of pages in-flight. The mechanism checks the tail index of the request with the reported tail index. The difference between them is the number of pages in flight that, the target has sent but the initiator has not yet received. It is possible that this number is not zero if the initiator has sent this page request before processing the in-flight page advertise message. At branch 1206, the mechanism determines whether the number of pages in flight is not less than the maximal pages specified in the request. If yes (the previous page advertise from target has already satisfied this request), then operation ends (block 1203). If no, then operation proceeds to block 1207, where the mechanism computes the number of non-sent pages. The number of non-sent pages is the difference between the tail index and reported tail index on target. It is possible that this number is not zero, if the target application has previously tried to advertised pages, but page advertisements could not be sent due to lack of credits.

At block 1208, the mechanism recomputes the minimal and maximal number of pages in the initiator request. The minimal and maximal number are decremented by the number of pages in flight but are not allowed to go below zero. Furthermore, the maximal number is not allowed to be larger than the amount of non-sent pages plus the amount of free page slots. In addition, if the number of free pages is below a defined threshold, the maximal number of pages is set to the amount of free page slots (full array refill is requested). At branch 1209, the mechanism determines whether the number of non-sent pages is not less than the recomputed maximal number of pages. If yes, then the mechanism calls the page advertise function (block 1210), and operation ends (block 1203). The page advertise function starts from block 1106 of FIG. 11.

If non-sent pages number does not satisfy the page request (block 1209: NO), the operation proceeds to block 1211, where the page advertise credit is recorded. The mechanism then computes the missing pages number as the difference between recomputed maximal number and non-sent pages (block 1212). Then, the mechanism requests pages from the target application (block 1213). The minimal number of pages in the request is the recomputed minimal number, and the maximal number of pages is the missing pages number. At branch 1214, the mechanism checks whether the page advertise credit has changed. If credit has changed (target has provided pages and has invoked page advertise function), then operation ends (block 1203). If credit has not changed (block 1214: NO), the mechanism determines whether the number of non-sent pages is zero. If the number of non-sent pages is zero, then operation ends (block 1203). If the number of non-sent pages is not zero (pages to advertise are available and target application has not added new pages or could not send because lack of credits), then operation proceeds to block 1210, where page advertise function is called, and operation ends (block 1203).

Figure 13:
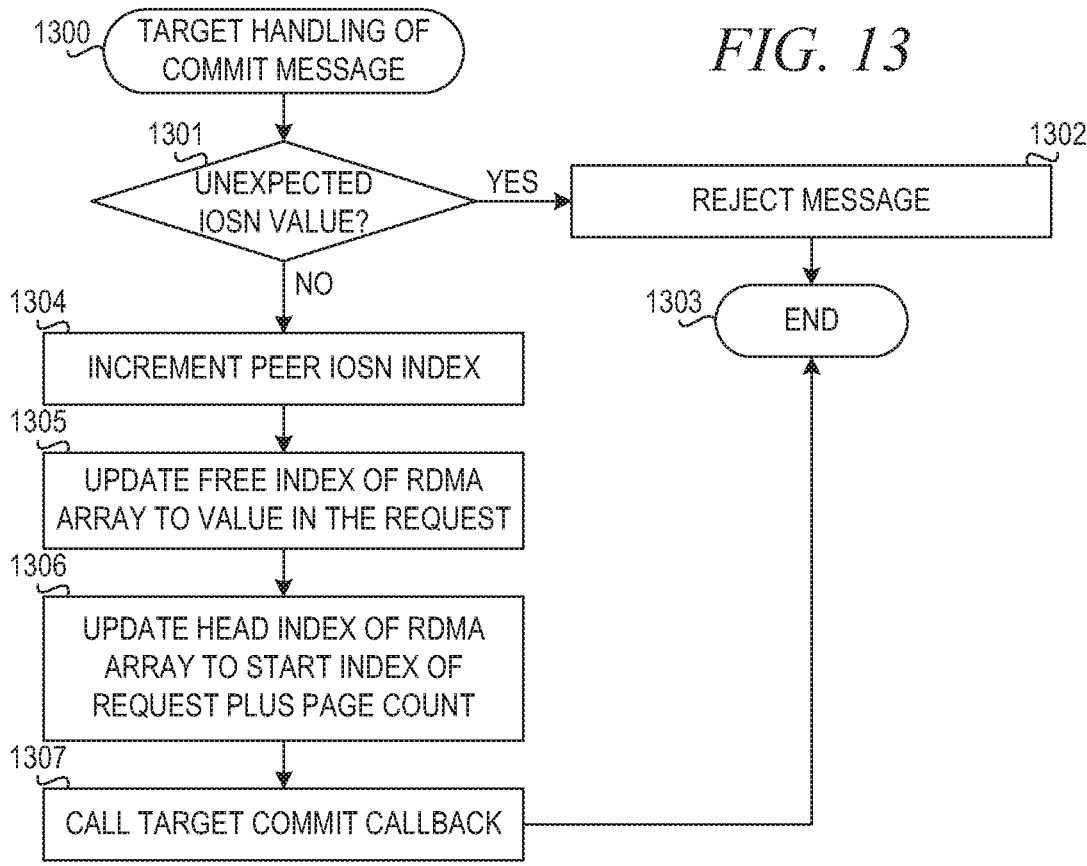
FIG. 13 is a flowchart illustrating operation of a mechanism for target handling of a commit message in accordance with an illustrative embodiment.

FIG. 13 is a flowchart illustrating operation of a mechanism for target handling of a commit message in accordance with an illustrative embodiment. Operation begins with the receipt of a commit message (block 1300), and the mechanism determines whether the peer (initiator) ISON value of the request is an unexpected value (block 1301). The target may track initiator IOSN values to detect protocol violations. If the mechanism determines the IOSN value is unexpected, then the mechanism rejects the message (block 1302). Thereafter, operation ends (block 1303).

If the IOSN value is not an unexpected value in block 1301, then the mechanism increments the peer (initiator) IOSN index on the target (block 1304). For aggregated messages, the IOSN is incremented by more than one. The mechanism updates the free index of the RDMA array to the value in the request (block 1305). The mechanism updates the head index of the RDMA array to the start index of the request plus the page count number of the request (block 1306). The mechanism then calls the target commit callback (block 1307), and operation ends (block 1303).

Figure 14:
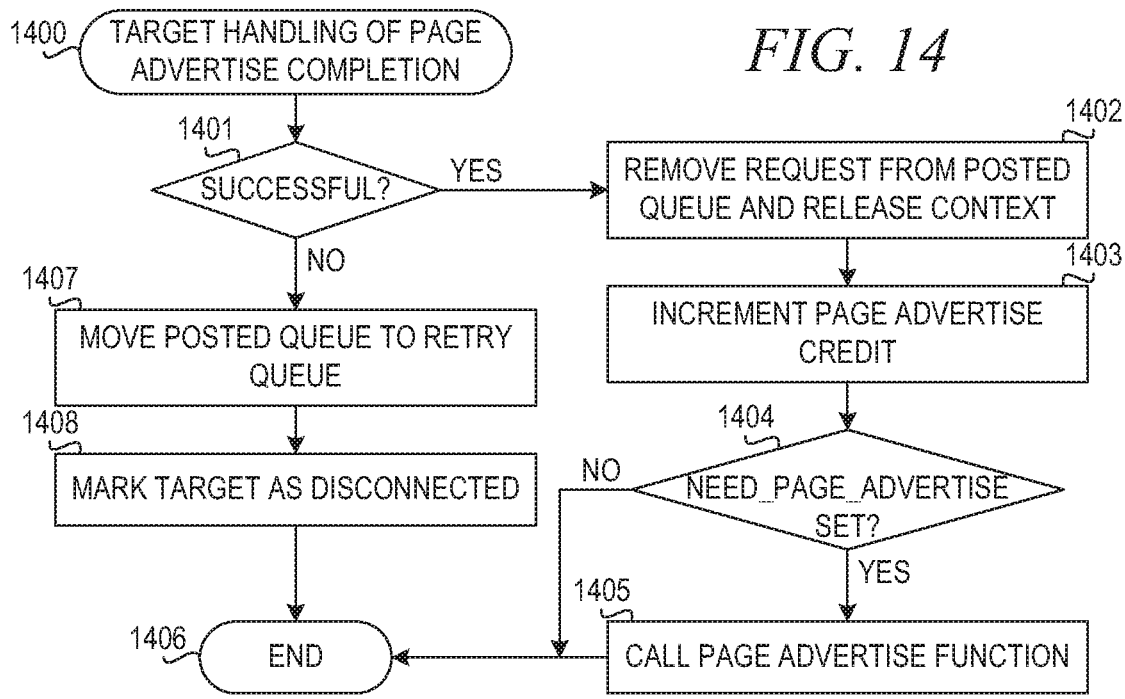
FIG. 14 is a flowchart illustrating operation of a mechanism for target handling of a page advertise completion in accordance with an illustrative embodiment.

FIG. 14 is a flowchart illustrating operation of a mechanism for target handling of a page advertise completion in accordance with an illustrative embodiment. Operation begins with the receipt of a page advertise request (block 1400), and the mechanism determines whether the completion indicates success (block 1401). If the completion indicates success, the mechanism removes the request from the posted queue and releases the request context (block 1402). The mechanism increments the page advertise credit value (block 1403). The mechanism then checks whether NEED_PAGE_ADVERTISE flag is set (branch 1404). If yes, the page advertise function (from FIG. 11) is called (block 1405). Thereafter, operation ends (block 1406). If NEED_PAGE_ADVERTISE flag is not set, the operation proceeds to end (block 1406).

If the completion does not indicate success in block 1401, then the mechanism moves all requests from the posted queue to the retry queue (block 1407) and marks the target as disconnected (block 1408). Thereafter, operation ends (block 1406).

FIG. 15 is a flowchart illustrating operation of a mechanism for disconnect handling in accordance with an illustrative embodiment. Operation begins when an initiator or target disconnects (block 1500) The mechanism clears the receive queue (block 1501). Both the initiator and the target shall clear its receive queue before resetting connection or they risk receiving with error transactions seen by the peer as completed. To do so, the mechanism polls the receive queue until its queue depth is reached or until no new completions are seen, whichever comes first. After that, the mechanism resets the connection (block 1502), and marks the state of the initiator or target as disconnected (bock 1503). Thereafter, operation ends (block 1504).

FIG. 16 is a flowchart illustrating operation of a mechanism for handling target dead node event by the initiator in accordance with an illustrative embodiment. Operation begins when a dead node event is received (block 1600). The posted queue is expected to be empty, because all disconnect handling should have been completed at this point. The mechanism calls callbacks of all requests from the retry and pending queues with error status (NOT_SENT) (block 1601). The mechanism releases the request contexts of the retry queue (block 1602). Then, the mechanism empties retry and pending queues (block 1603). The mechanism marks the initiator status as flushed (meaning the target node is blacklisted) and disconnected (block 1604). The mechanism then resets all indexes of the RDMA array to zero (block 1605), and operation ends (block 1606).

FIG. 17 is a flowchart illustrating operation of a mechanism for handling initiator dead node event by target in accordance with an illustrative embodiment. Operation begins when a dead node event is received (block 1700). The posted queue is expected to be empty, because all disconnect handling should have been completed at this point. The mechanism removes all requests from the retry queue and releases request contexts (block 1701). The mechanism calls target callback to free pages from the RDMA array (block 1702) and marks the target status as flushed (meaning the initiator node is blacklisted) (block 1703). The mechanism then resets all indexes of the RDMA array to zero (block 1704), and operation ends (block 1705).

Figure 18:
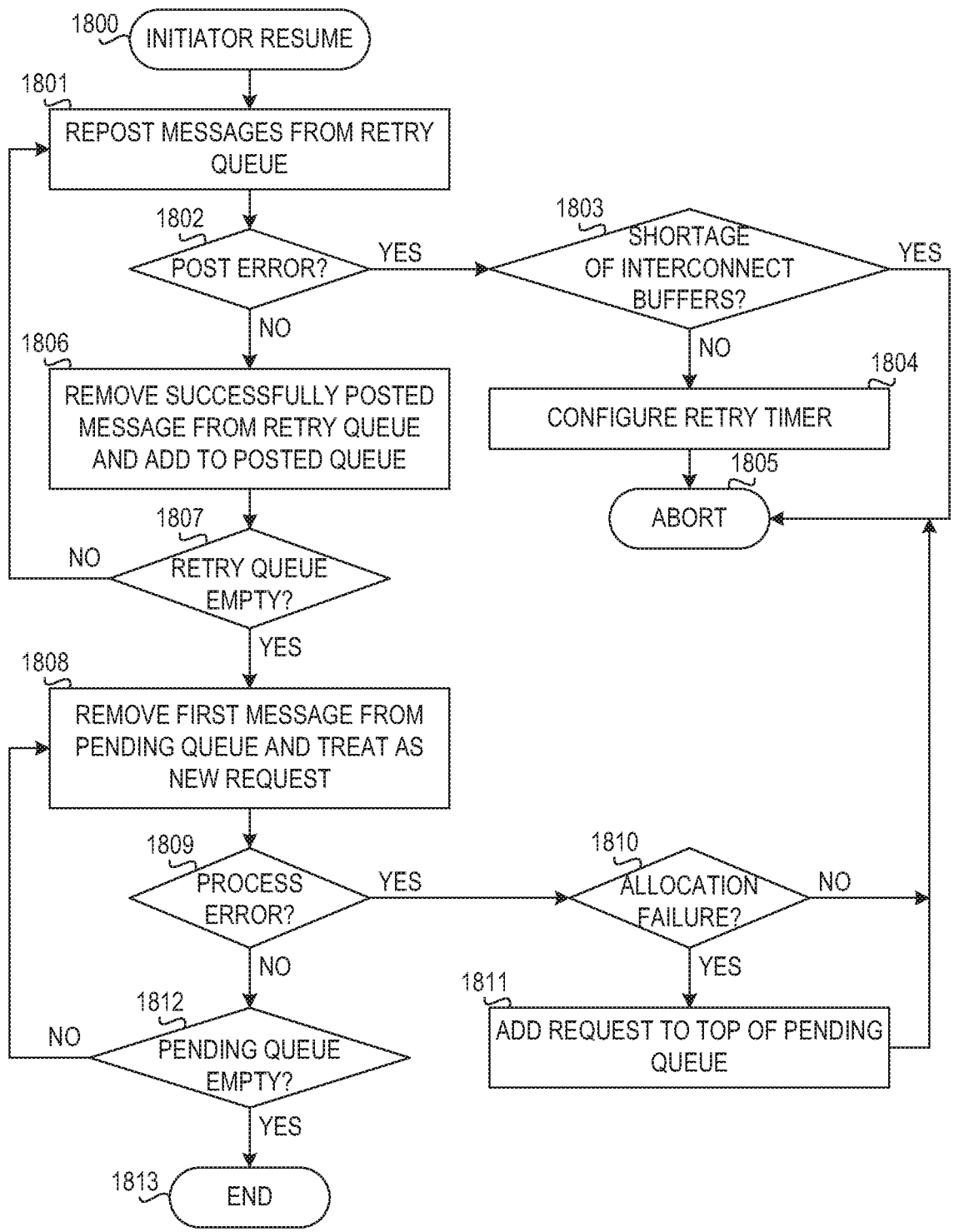
FIG. 18 is a flowchart illustrating operation of mechanism for initiator and target resume in accordance with an illustrative embodiment.

FIG. 18 is a flowchart illustrating operation of mechanism for initiator and target resume in accordance with an illustrative embodiment. Initiator and target resume can be called from a connection event (when a previously broken connection resumes and login completes) or from a retry timer or successful completion When previously unavailable resources become available. Operation begins (block 1800), where the mechanism reposts the first message from the retry queue (block 1801). At branch 1802, the post status is checked. If the mechanism determines that there was a post error (block 1802: YES), then the mechanism determines whether the failure was due to the shortage of interconnect buffers (block 1803). If the failure was due to the shortage of interconnect buffers, then the mechanism configures a retry timer (block 1804). Thereafter, or if the mechanism determines that the failure was not due to a shortage of interconnect buffers, the resume aborts (block 1805).

If there is no post error (block 1802: NO), then the mechanism removes the successfully posted message from the retry queue and adds it to the posted queue (block 1806). The mechanism determines whether the retry queue is empty (block 1807). If the retry queue is not empty, then operation returns to block 1801 to report the next message from the retry queue.

If the retry queue is empty in block 1807, the mechanism takes the first message from the pending queue and treats it as a new initiator or target request (block 1808). This step removes the message from the pending queue and invokes standard request functions that can modify the posted and retry queues, with the exception that if there are no local resources to frame the request, it will not be added to pending queue but allocation failure will be returned. The mechanism determines whether there is a request process error (branch 1809). If there is a request process error, the error status is examined to be allocation failure (branch 1810). If the error is allocation error, the request is added to the top of the pending list (block 1811) and operation aborts (step 1805). If the error is not an allocation error but a post error, the request has been added to the retry list, and operation aborts (step 1805).

If there is not a request process error block 1809, the mechanism determines whether the pending queue is empty (block 1812). If the pending queue is not empty, then operation returns to block 1808 to take the next message from the pending queue. If the pending queue is empty in block 1812, then operation ends (block 1813).

Both initiator and target rely on local completions to conclude that the peer has received the message. This is true for successful completions (provided the peer clears receive queue before it resets the connection). However, this is not true for completions received with error. The local error completion does not mean the peer has not received the transaction. This can happen during a loss of the physical when peer sees the message but cannot acknowledge it using the physical layer because the link has gone down. Or it may happen because the peer was very busy and has not acknowledged completion in time using the physical layer, causing a peer timeout error. In order to avoid the data corruption on the peer after reconnect (by resending the data that has been received and used) a synchronization message is needed that will inform the peer about the last IOSN received. The login message solves this task. The login message has only the message code (login).

Figure 19A:
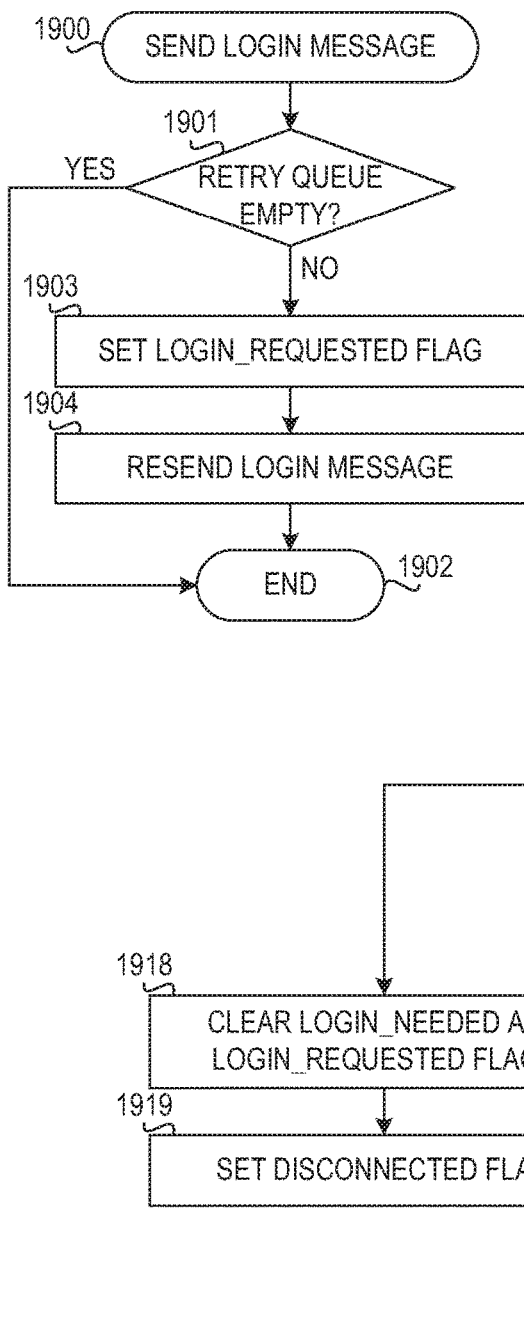
FIGS. 19a and 19b are flowcharts illustrating operation of a mechanism for sending a login message from timer in accordance with an illustrative embodiment.
Figure 19B:
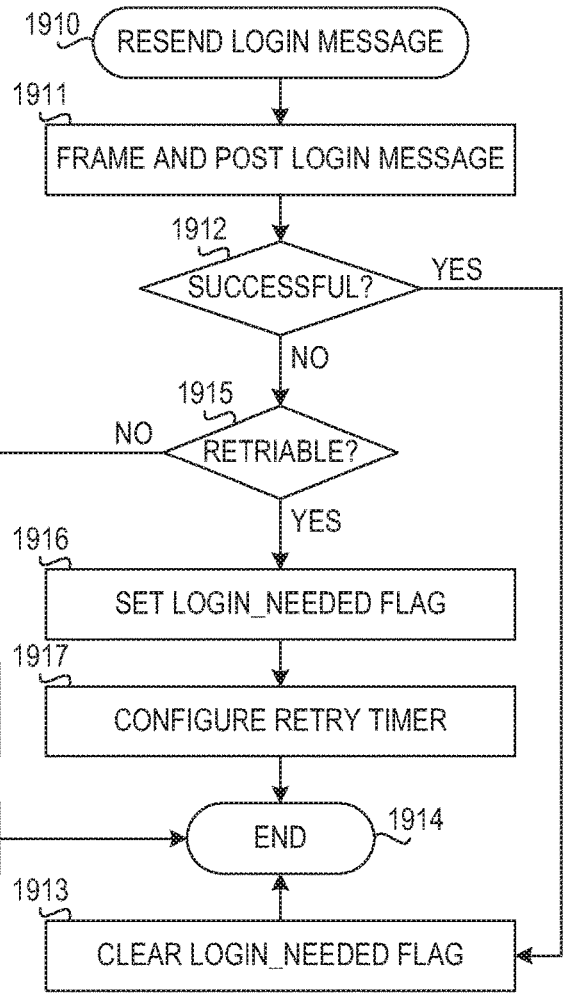

FIGS. 19A and 19B are flowcharts illustrating operation of a mechanism for sending a login message from connection event in accordance with an illustrative embodiment. Handling of login messages is the same for the initiator and the target. Operation begins (block 1900), upon transitioning to a connected state the mechanism determines whether the retry queue is empty (block 1901). If the retry queue is empty, then operation ends (block 1902). If the retry queue is not empty, the mechanism sets the LOGIN_REQUESTED flag (block 1903). Once the LOGIN_REQUESTED flag is set, no resume or post is allowed. All new posts go to the pending queue. Thereafter, the mechanism invokes the resend login message function (block 1904 see FIG. 19B), and operation ends (block 1902).

FIG. 19B illustrates the resend login function. Operation begins at block 1910. At block 1911, the login message is framed and sent. Login message requires no allocated context and has only the message opcode and the IOSN number. No completion is requested for login message, and no protocol callback is invoked for it. The mechanism then determines whether the post is successful (block 1912). If the post is successful, the mechanism clears the LOGIN_NEEDED flag (block 1913), and operation ends (block 1914). If the mechanism determines the post is not successful and completes with error in block 1912, the mechanism examines the error code is retriable (block 1915). The error is retriable when error indicated that queues are full on interconnect). If the error is retriable, then the mechanism sets LOGIN_NEEDED flag (block 1916) and configures a retry timer (block 1917). Then, operation ends (block 1914). If the error is not retriable (i.e., the peer has disconnected), operation clears LOGIN_NEEDED and LOGIN_REQUESTED flags (block 1918), sets disconnected flag (block 1919), and ends (block 1914).

FIG. 20 is a flowchart illustrating operation of a mechanism for retrying login from the timer in accordance with an illustrative embodiment. Operation begins (block 2000), and the mechanism determines whether the LOGIN_NEEDED flag is set (block 2001). If the LOGIN_NEEDED flag is not set, then operation ends (block 2003). If the LOGIN_NEEDED flag is set in block 2001, then the mechanism resends the login message (block 2002, see FIG. 19B), and operation ends (block 2003).

FIG. 21 is a flowchart illustrating operation of a mechanism for handling login message response in accordance with an illustrative embodiment. Operation beings upon receiving the login message response (block 2100), and the mechanism examines the retry queue (block 2101). The mechanism removes all entries with IOSN less than or equal to the value in the response from the retry queue and considers them to complete with OK status (block 2102). On the initiator, the mechanism calls appropriate callbacks (block 2103). Then, the mechanism clears LOGIN_REQUESTED flag (block 2104), resumes the instance (initiator or target) (block 2105), and operation ends (block 2106).

Figure 22:
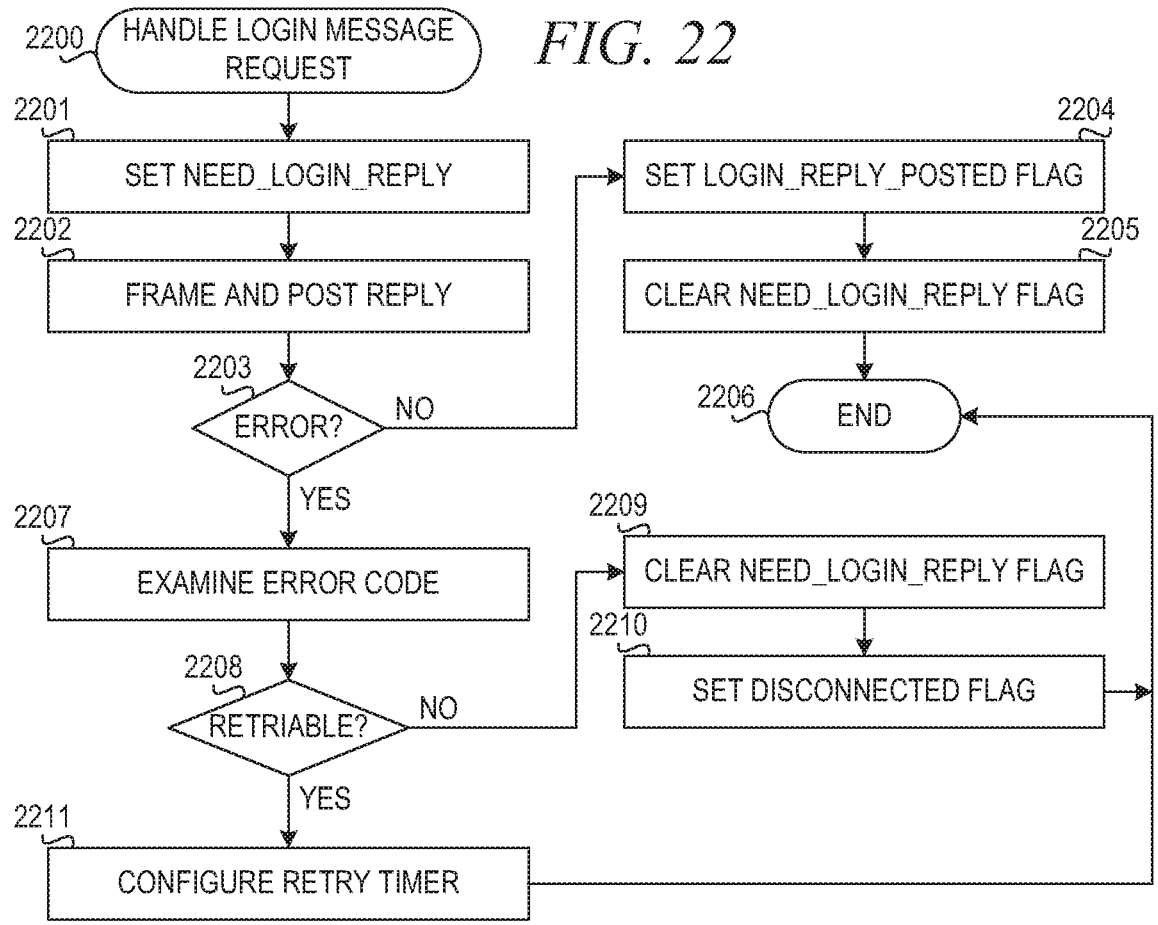
FIG. 22 is a flowchart illustrating operation of a mechanism for handling a login message request in accordance with an illustrative embodiment.

FIG. 22 is a flowchart illustrating operation of a mechanism for handling a login message request in accordance with an illustrative embodiment. Operation begins upon receiving a login message request (block 2200), and the mechanism sets the NEED_LOGIN_REPLY flag (block 2201). The mechanism frames and posts the reply (block 2202). The login response message has the following fields: message code (login response) and the last peer IOSN that has been processed by the receiver. No context is allocated for the message, but the completion is requested. The mechanism determines whether the post completes with error (block 2203). If the post completes without error, then the mechanism sets the LOGIN_REPLY_POSTED flag (block 2204), clears NEED_LOGIN_REPLY flag (block 2205), and operation ends (block 2206). If the post completes with error in block 2203, then the mechanism examines the error code (block 2207) and determines whether the error is retriable (block 2208). If the error is not retriable, the mechanism clears the NEED_LOGIN_REPLY flag (block 2209), sets DISCONNECTED flag (block 2210), and then operation ends (block 2206), if the error is retriable, then the mechanism configures a retry timer (block 2211), and operation ends (block 2206).

Figure 23:
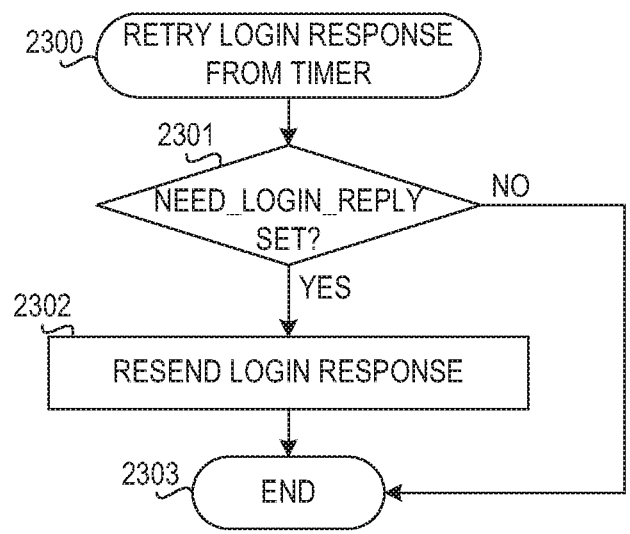
FIG. 23 is a flowchart illustrating operation of a mechanism for retrying login response from timer in accordance with an illustrative embodiment.

FIG. 23 is a flowchart illustrating operation of a mechanism for retrying login response from a timer in accordance with an illustrative embodiment. Operation begins (block 2300), and the mechanism determines whether the NEED_LOGIN_REPLY flag is set (block 2301). If the NEED_LOGIN_REPLY flag is not set in block 2301, then operation ends (block 2303). If the NEED_LOGIN_REPLY flag is set in block 2301, then the mechanism resends the login response message (block 2302, see FIG. 22), and operation ends (block 2304). The login response message has the following fields: message code (login response) and last initiator IOSN that completed without error. The login response message is sent using the normal send function and will be received by the target.

FIG. 24 is a flowchart illustrating operation of a mechanism for handling a login response completion in accordance with an illustrative embodiment. Operation begins upon receiving a login response completion (block 2400), and the mechanism removes the LOGIN_REPLY_POSTED flag (block 2401). The mechanism determines whether the login reply completed successfully (block 2402). If the login reply completed successfully, then operation ends (block 2403). If the login reply did not complete successfully, then the DISCONNECT and NEED_LOGIN reply flags are set (block 2404) operation ends (block 2403). Upon completion failure, NEED_LOGIN_REPLY flag is set. This is because initiator and target may use half-duplex connections (like XRC), and disconnect of local node does not mean that remote node has lost connection. When connection is resumed, the NEED_LOGIN_REPLY flag is checked. If it is set, the local node will resend login reply, without receiving the peer login request (that may not arrive, since the peer may have not disconnected).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor and configure the at least one processor to implement a replication protocol for replicating memory from an initiator to a target, the method comprising:

requesting, by the initiator, one or more pages of memory at the target;

responsive to the initiator receiving a page advertisement from the target, updating a list of pages at the initiator, wherein the list of pages is replicated at the target;

performing, by the initiator, a remote direct memory access (RDMA) write to the one or more pages of memory at the target;

responsive to successful completion of the RDMA write, updating the list of pages at the initiator, wherein upon completion of the RDMA write the list of pages is updated at the target;

responsive to disconnecting from the target and subsequently reconnecting to the target, receiving a login message from the target;

sending a login reply message to the target, wherein the login reply message comprises a message code and a last initiator input/output sequence number (IOSN) that completed without error; and responsive to receiving a login reply message from the target comprising a last target input/output initiator sequence number (IOSN) processed by target, removing all messages from a retry queue having an IOSN less than or equal to the last IOSN reported as processed by target and resuming the initiator.

2. The method of claim 1, further comprising, responsive to successful completion of the RDMA write, sending a commit message from the initiator to the target.

3. The method of claim 1, wherein the list of pages at the initiator is a circular queue, wherein a head index points to a next free page in an RDMA pool at the initiator, wherein a tail index points to a last free page in the RDMA pool at the initiator, and wherein a free index points to a last index in the RDMA pool that is not populated with any page.

4. The method of claim 1, wherein performing the RDMA write comprises sending an RDMA request from the initiator to the target and placing the RDMA request in a posted queue at the initiator and wherein performing the RDMA write further comprises adding the RDMA request to a pending queue at the initiator responsive to determining the pending queue or a retry queue at the initiator is not empty, determining the target is disconnected, or determining there are not enough memory pages for the RDMA request at the target.

5. The method of claim 1, wherein performing the RDMA write comprises sending an RDMA request from the initiator to the target and placing the RDMA request in a posted queue at the initiator and wherein performing the RDMA write further comprises adding the RDMA request to a retry queue at the initiator responsive to determining that the RDMA write failed.

6. The method of claim 1, wherein performing the RDMA write comprises sending an RDMA request from the initiator to the target and placing the RDMA request in a posted queue at the initiator and wherein performing the RDMA write further comprises adding the RDMA request to a posted list at the initiator responsive to determining that the RDMA write succeeded.

7. The method of claim 1, wherein performing the RDMA write comprises sending an RDMA request from the initiator to the target and placing the RDMA request in a posted queue at the initiator and wherein performing the RDMA write further comprises sending a commit message responsive to successful completion of the RDMA write.

8. The method of claim 1, wherein the initiator and the target use input/output sequence numbers (IOSNs) to track messages.

9. The method of claim 1, further comprising:

responsive to determining the target is blacklisted, calling an application callback with immediate failure status.

10. A computer program product comprising a non-transitory computer readable storage medium having a computer readable program stored therein, wherein the computer readable program, when executed on a computing device, causes the computing device to implement a replication protocol for replicating memory from an initiator to a target, wherein the computer readable program causes the computing device to:

request, by the initiator, one or more pages of memory at the target;

responsive to the initiator receiving a page advertisement from the target, update a list of pages at the initiator, wherein the list of pages is replicated at the target;

perform, by the initiator, a remote direct memory access (RDMA) write to the one or more pages of memory at the target;

responsive to successful completion of the RDMA write, update the list of pages at the initiator, wherein upon completion of the RDMA write the list of pages is updated at the target;

responsive to disconnecting from the target and subsequently reconnecting to the target, receive a login message from the target;

send a login reply message to the target, wherein the login reply message comprises a message code and a last initiator input/output sequence number (IOSN) that completed without error; and responsive to receiving a login reply message from the target comprising a last target input/output initiator sequence number (IOSN) processed by target, remove all messages from a retry queue having an IOSN less than or equal to the last IOSN reported as processed by target and resume the initiator.

11. The computer program product of claim 10, wherein the computer readable program further causes the computing device to, responsive to successful completion of the RDMA write, sending a commit message from the initiator to the target.

12. The computer program product of claim 10, wherein the list of pages at the initiator is a circular queue, wherein a head index points to a next free page in an RDMA pool at the initiator, wherein a tail index points to a last free page in the RDMA pool at the initiator, and wherein a free index points to a last index in the RDMA pool that is not populated with any page.

13. The computer program product of claim 10, wherein performing the RDMA write comprises sending an RDMA request from the initiator to the target and placing the RDMA request in a posted queue at the initiator and wherein performing the RDMA write further comprises adding the RDMA request to a pending queue at the initiator responsive to determining the pending queue or a retry queue at the initiator is not empty, determining the target is disconnected, or determining there are not enough memory pages for the RDMA request at the target.

14. The computer program product of claim 10, wherein performing the RDMA write comprises sending an RDMA request from the initiator to the target and placing the RDMA request in a posted queue at the initiator and wherein performing the RDMA write further comprises adding the RDMA request to a retry queue at the initiator responsive to determining that the RDMA write failed.

15. The computer program product of claim 10, wherein performing the RDMA write comprises sending an RDMA request from the initiator to the target and placing the RDMA request in a posted queue at the initiator and wherein performing the RDMA write further comprises adding the RDMA request to a posted list at the initiator responsive to determining that the RDMA write succeeded.

16. The computer program product of claim 10, wherein performing the RDMA write comprises sending an RDMA request from the initiator to the target and placing the RDMA request in a posted queue at the initiator and wherein performing the RDMA write further comprises sending a commit message responsive to successful completion of the RDMA write.

17. An apparatus comprising:

at least one processor; and a memory coupled to the at least one processor, wherein the memory comprises instructions which, when executed by the at least one processor, cause the at least one processor to implement a replication protocol for replicating memory from an initiator to a target, wherein the instructions cause the at least one processor to:

request, by the initiator, one or more pages of memory at the target;

responsive to the initiator receiving a page advertisement from the target, update a list of pages at the initiator, wherein the list of pages is replicated at the target;

perform, by the initiator, a remote direct memory access (RDMA) write to the one or more pages of memory at the target;

responsive to successful completion of the RDMA write, update the list of pages at the initiator, wherein upon completion of the RDMA write the list of pages is updated at the target;

responsive to disconnecting from the target and subsequently reconnecting to the target, receive a login message from the target;

send a login reply message to the target, wherein the login reply message comprises a message code and a last initiator input/output sequence number (IOSN) that completed without error; and responsive to receiving a login reply message from the target comprising a last target input/output initiator sequence number (IOSN) processed by target, remove all messages from a retry queue having an IOSN less than or equal to the last IOSN reported as processed by target and resume the initiator.

* * * * *